United States Patent
Brusberg et al.

(10) Patent No.: US 12,540,097 B2
(45) Date of Patent: Feb. 3, 2026

(54) GLASS COMPOSITION FOR GLASS SUBSTRATES CONTAINING OPTICAL WAVEGUIDES

(71) Applicant: CORNING INCORPORATED, Corning, NY (US)

(72) Inventors: Lars Martin Otfried Brusberg, Potsdam (DE); Matthew John Dejneka, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 19/263,960

(22) Filed: Jul. 9, 2025

(65) Prior Publication Data
US 2025/0333347 A1    Oct. 30, 2025

Related U.S. Application Data

(63) Continuation of application No. PCT/US2024/053372, filed on Oct. 29, 2024.
(Continued)

(51) Int. Cl.
*G02B 6/12*  (2006.01)
*C03C 3/091*  (2006.01)
(Continued)

(52) U.S. Cl.
CPC ............. *C03C 3/091* (2013.01); *C03C 3/095* (2013.01); *C03C 3/097* (2013.01); *C03C 21/005* (2013.01);
(Continued)

(58) Field of Classification Search
CPC .......... G02B 2006/12038; G02B 6/122; G02B 6/0038; G02B 6/1345
See application file for complete search history.

(56) References Cited

U.S. PATENT DOCUMENTS

| 4,665,039 | A | * | 5/1987 | Kokubu | ................ | C03C 11/005 501/59 |
| 4,913,717 | A | * | 4/1990 | Cooper | ................ | C03C 21/003 65/30.13 |

(Continued)

FOREIGN PATENT DOCUMENTS

| CN | 101609181 B | 2/2011 |
| CN | 103172266 A | 6/2013 |

(Continued)

OTHER PUBLICATIONS

Brusberg et al. "Glass Platform for Co-Packaged Optics" IEEE Journal of Selected Topics in Quantum Electronics 29.3, 2023, pp. 1-10.
(Continued)

*Primary Examiner* — Eric Wong
(74) *Attorney, Agent, or Firm* — Russell S. Magaziner

(57) ABSTRACT

Disclosed herein are embodiments of a glass composition including $SiO_2$ in an amount in a range from 53 mol % to 84 mol %, $Al_2O_3$ in an amount in a range from 0.3 mol % to 20 mol %, $Na_2O$ in an amount in a range from 3 mol % to 16 mol %, and at least one of $Cs_2O$ or $Rb_2O$ in an amount in a range from 0.05 mol % to 8 mol %. The glass composition has a first silver ion diffusivity at 110° C. of $5\times10^{-19}$ m²/s or less, and the glass composition has a second silver ion diffusivity at 350° C. of at least $5\times10^{-17}$ m²/s at 350° C. The glass composition is particularly suitable for use as a glass substrate of a photonic chip package.

20 Claims, 9 Drawing Sheets

Related U.S. Application Data

(60) Provisional application No. 63/604,629, filed on Nov. 30, 2023.

(51) Int. Cl.
*C03C 3/095* (2006.01)
*C03C 3/097* (2006.01)
*C03C 21/00* (2006.01)
*G02B 6/122* (2006.01)

(52) U.S. Cl.
CPC .... G02B 6/122 (2013.01); *G02B 2006/12038* (2013.01)

(56) References Cited

U.S. PATENT DOCUMENTS

| | | | |
|---|---|---|---|
| 10,459,160 B2 | 10/2019 | Brusberg | |
| 2005/0054509 A1 | 3/2005 | Hoen et al. | |
| 2006/0034566 A1* | 2/2006 | Wakita | G02B 6/0038 385/31 |
| 2010/0210753 A1 | 8/2010 | Ritter et al. | |
| 2020/0346967 A1* | 11/2020 | Brusberg | G02B 6/122 |
| 2021/0271037 A1 | 9/2021 | Brusberg et al. | |
| 2022/0153635 A1* | 5/2022 | Ni | C03C 3/087 |

FOREIGN PATENT DOCUMENTS

| | | | |
|---|---|---|---|
| CN | 102633434 B | 5/2014 | |
| EP | 1514850 A1 | 3/2005 | |
| EP | 1717213 A1 * | 11/2006 | C09D 5/36 |

OTHER PUBLICATIONS

Brusberg et al., "Study of Temperature and Time Dependent Performance Alteration of Silver Ion-exchanged Waveguides in Glass" IEEE, 2020, 5 pages.

International Search Report and Written Opinion of the International Searching Authority; PCT/US2024/053372; dated Mar. 12, 2025; 11 pages; European Patent Office.

Rehouma et al., "Special glass for silver-sodium ion exchanged waveguides" Journal of King Saud University Science 32 (2020), pp. 433-435.

* cited by examiner

GLASS COMPOSITION FOR GLASS SUBSTRATES CONTAINING OPTICAL WAVEGUIDES

CROSS-REFERENCE TO RELATED APPLICATIONS

This application is a continuation of International Patent Application Serial No. PCT/US2024/053372, filed on Oct. 29, 2024, which claims the benefit of priority of U.S. Provisional Application Ser. No. 63/604,629, filed on Nov. 30, 2023, the contents of each of which is relied upon and incorporated herein by reference in its entirety.

BACKGROUND

The disclosure relates to glass compositions and a glass substrate formed thereform and, in particular, to a glass composition suitable for forming optical waveguides for use in glass packaging substrates.

Optical waveguides are finding increasing use in forming optical links with silicon photonic integrated circuits (PIC) mounted on printed circuit boards (PCBs) that support optical transceiver modules. In some cases, the optical waveguides are integrated in PCBs and are optically connected to optical fibers. The increasing demands on the performance of silicon photonics systems places increasing demands on the performance of optical waveguides used in such systems, such as requirements for matching coefficients of thermal expansion between the glass, PIC and PCB, thermal and mechanical stability of the optical waveguide, and low or zero birefringence.

SUMMARY

According to a first aspect, embodiments of the present disclosure relate to a glass composition including $SiO_2$ in an amount in a range from 53 mol % to 84 mol %, $Al_2O_3$ in an amount in a range from 0.3 mol % to 20 mol %, $Na_2O$ in an amount in a range from 3 mol % to 16 mol %, and at least one of $Cs_2O$ or $Rb_2O$ in an amount in a range from 0.05 mol % to 8 mol %. The glass composition has a first silver ion diffusivity at 110° C. of $5 \times 10^{-19}$ m$^2$/s or less, and the glass composition has a second silver ion diffusivity at 350° C. of at least $5 \times 10^{-17}$ m$^2$/s at 350° C.

According to a second aspect, embodiments of the present disclosure relate to a glass composition including $SiO_2$ in an amount in a range from 53 mol % to 84 mol %, $Cs_2O$ in an amount in a range from 0.25 mol % to 8 mol %, $Al_2O_3$ in an amount in a range from 0.3 mol % to 20 mol %, $B_2O_3$ in an amount in a range from 0.25 mol % to 16 mol %, $Na_2O$ in an amount in a range from 3 mol % to 16 mol %, SrO in an amount in a range of 0 mol % to 10 mol %, MgO in an amount in a range for 0 mol % to 5.3 mol %, $K_2O$ in an amount in a range from 0 mol % to 8 mol %, CaO in an amount in a range from 0 mol % to 8 mol %, $Rb_2O$ in an amount in a range from 0 mol % to 4 mol %, $Fe_2O_3$ in an amount in a range of 0 mol % to 0.2 mol %, and BaO in an amount in a range from 0 mol % to 8 mol %.

According to a third aspect, embodiments of the present disclosure relate to a glass composition including $SiO_2$ in an amount in a range from 53 mol % to 84 mol %, $Cs_2O$ in an amount in a range from 0.35 mol % to 8 mol %, $Al_2O_3$ in an amount in a range from 1 mol % to 20 mol %, $B_2O_3$ in an amount in a range from 0 mol % to 20 mol %, $Na_2O$ in an amount in a range from 3.2 mol % to 12.75 mol %, SrO in an amount in a range of 0 mol % to 10 mol %, MgO in an amount in a range for 0 mol % to 8 mol %, $K_2O$ in an amount in a range from 0 mol % to 4.5 mol %, CaO in an amount in a range from 0 mol % to 8 mol %, $Rb_2O$ in an amount in a range from 0 mol % to 6 mol %, $Fe_2O_3$ in an amount in a range of 0 mol % to 0.2 mol %, and a combined amount of MgO, CaO, and SrO in a range from 1 mol % to 16 mol %.

According to a fourth aspect, embodiments of the present disclosure relate to a glass composition including $SiO_2$ in an amount in a range from 53 mol % to 84 mol %, $Cs_2O$ in an amount in a range from 0.35 mol % to 8 mol %, $Al_2O_3$ in an amount in a range from 1 mol % to 20 mol %, $B_2O_3$ in an amount in a range from 0 mol % to 20 mol %, $Na_2O$ in an amount in a range from 3.2 mol % to 16 mol %, SrO in an amount in a range of 0 mol % to 10 mol %, MgO in an amount in a range for 0 mol % to 5.3 mol %, $K_2O$ in an amount in a range from 0 mol % to 4.5 mol %, CaO in an amount in a range from 0 mol % to 8 mol %, $Rb_2O$ in an amount in a range from 0 mol % to 8 mol %, $Fe_2O_3$ in an amount in a range of 0 mol % to 0.2 mol %, and a combined amount of MgO, CaO, and SrO in a range from 1 mol % to 16 mol %.

According to a fifth aspect, embodiments of the present disclosure relate to a glass composition including $SiO_2$ in an amount in a range from 52 mol % to 84 mol %, $Cs_2O$ in an amount in a range from 0.25 mol % to 8 mol %, $Al_2O_3$ in an amount in a range from 2 mol % to 12 mol %, $B_2O_3$ in an amount in a range from 4 mol % to 15 mol %, $Na_2O$ in an amount in a range from 4 mol % to 16 mol %, SrO in an amount in a range of 0 mol % to 7 mol %, CaO in an amount in a range from 0 mol % to 15 mol %, and $Fe_2O_3$ in an amount in a range of 0 mol % to 0.2 mol %.

According to a sixth aspect, embodiments of the present disclosure relate to a glass composition including $SiO_2$ in an amount in a range from 52 mol % to 84 mol %, $Al_2O_3$ in an amount in a range from 2 mol % to 16 mol %, $B_2O_3$ in an amount in a range from 4 mol % to 16 mol %, $Na_2O$ in an amount in a range from 4 mol % to 16 mol %, SrO in an amount in a range of 0.25 mol % to 7 mol %, CaO in an amount in a range from 0 mol % to 15 mol %, at least one of $Cs_2O$ or $Rb_2O$ in an amount in a range from 0.05 mol % to 8 mol %, and $Fe_2O_3$ in an amount in a range of 0 mol % to 0.2 mol.

According to a seventh aspect, embodiments of the present disclosure relate to a glass composition including $SiO_2$ in an amount in a range from 59 mol % to 84 mol %, $Al_2O_3$ in an amount in a range from 0.3 mol % to 20 mol %, $B_2O_3$ in an amount in a range from 0.25 mol % to 16 mol %, $Na_2O$ in an amount in a range from 3 mol % to 16 mol %, $K_2O$ in an amount in a range form 0 mol % to 8 mol %, SrO in an amount in a range of 0 mol % to 10 mol %, CaO in an amount in a range from 0 mol % to 8 mol %, BaO in an amount in a range from 0 mol % to 8 mol %, MgO in an amount in a range from 0 mol % to 5.3 mol %, at least one of $Cs_2O$ or $Rb_2O$ in an amount in a range from 0.6 mol % to 8 mol %, and $Fe_2O_3$ in an amount in a range of 0 mol % to 0.2 mol.

According to an eighth aspect, embodiments of the present disclosure relate to a glass substrate formed from the glass composition of any of the first through seventh aspects. The glass substrate comprises a first major surface and a second major surface opposite to the first major surface. The glass substrate also comprises a waveguide disposed between the first major surface and the second major surface and closer to the first major surface. The waveguide has a refractive index profile comprising a first refractive index ($n_s$) at the first major surface, a bulk refractive index ($n_0$) of the glass composition, and a maximum refractive index ($n_1$)

within the waveguide such that $n_0 \leq n_s < n_1$. The glass substrate has a silver ion diffusivity of at most $5 \times 10^{-19}$ m$^2$/s at a temperature of 110° C.

According to a ninth aspect, embodiments of the present disclosure relate to a photonic chip package. The photonic chip package comprises a glass substrate according to the eighth aspect. The photonic chip package also comprises a photonic integrated circuit mounted on the glass substrate and in optical communication with the waveguide. Further, the photonic chip package comprises an electronic component mounted on the glass substrate and in electrical communication with the photonic integrated circuit.

According to a tenth aspect, embodiments of the present disclosure relate to a method. In the method, a mask is applied to a first portion of a first major surface of a glass substrate such that the mask defines an aperture in which a second portion of the first major surface is not covered by the mask. The glass substrate comprises the first major surface and a second major surface opposite to the first major surface, and the glass substrate is formed from a glass composition according to any of the first through seventh aspects. Further, in the method, the second portion of the first major surface is first exposed to a first bath containing silver ions, and silver ions from the first bath are exchanged with sodium ions from the glass substrate. In the method, the second portion of the first major surface is second exposed to a second bath containing sodium ions, and silver ions from the glass substrate are exchanged with sodium ions from the second bath so as to define a waveguide between the first major surface and the second major surface of the glass substrate. The waveguide is closer to the first major surface than to the second major surface.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. In the drawings.

DETAILED DESCRIPTION

Reference will now be made in detail to various embodiments of a glass composition suitable for use in photonic chip packages, examples of which are illustrated in the accompanying drawings. The glass composition is particularly suitable for formation of silver ion waveguides through ion exchange that are usable in high performance applications, such as data centers and telecommunications equipment. In these environments, photonic chip packages are subject to relatively high operational temperatures which may consistently be in the range of 50° C. to 110° C. Certain existing glasses that are ion-exchangable and that have high ion diffusivity would last only a matter of hours in these environments before performance of the waveguides degraded below acceptable standards. In contrast to such existing glasses, the glass composition according to the present disclosure has sufficient silver ion diffusivity at ion exchange temperatures (300° C. to 400° C.) while limiting silver ion diffusivity at operational temperatures. In this way, the glass composition can be used as a glass substrate in photonic chip packages that have a usable lifespan of five years or more. Such waveguides comprising compositions disclosed herein can also provide low propagation loss at optical communication wavelengths or wavelength ranges, such as O-band and/or C-band. Thus, the glass substrates comprising the glass compositions according to the present disclosure are suitable for use with other waveguide types, such as laser written waveguides. These and other aspects and advantages of the disclosed glass composition and glass substrates having waveguides will be described more fully below. The embodiments discussed herein are presented by way of illustration and not limitation.

Figure 1:
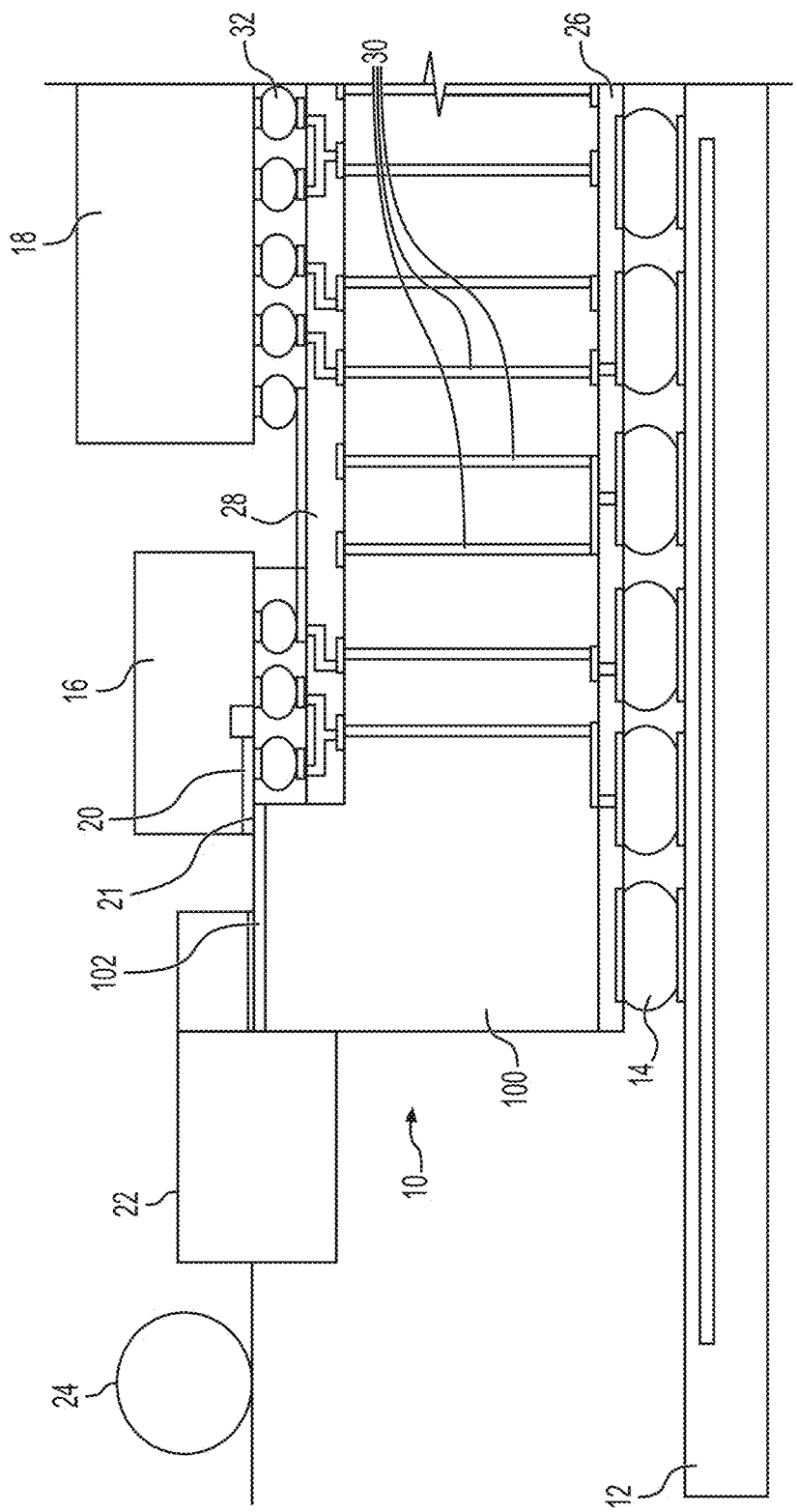
FIG. 1 is an illustration of an photonic chip package comprising a glass substrate having a waveguide formed therein, according to one or more embodiments.

Photonic chip packages for high-performance systems like data-center network switches and artificial intelligence (AI) and machine learning (ML) computer clusters have increasingingly employed glass as a packaging and optical interconnect substrate. Electrical links with data rates of 100 Gbit and above have high propagation loss and require a significant amount of power for signal processing and re-timing. For that reason, there is a desire to move optics deeper into the system to minimize the electrical line length. Optical transceivers are assembled on a common substrate together with the electrical chips to reduce the electrical line length to a few millimeters instead of tens of centimeters, which provides significant power savings by eliminating digital signal processing and re-timing electrical circuits. FIG. 1 demonstrates an example packaging concept for a glass substrate in a photonic chip package.

FIG. 1 depicts an embodiment of a photonic chip package 10. In the embodiment depicted in FIG. 1, the photonic chip package 10 is mounted to a printed circuit board (PCB) 12. In particular, a first ball grid array (BGA) 14 provides electrical connection between the photonic chip package 10 and the PCB 12. The photonic chip package 10 comprises a glass substrate 100 on which a photonic integrated circuit (PIC) 16 and an electronic component 18 are mounted. In one or more embodiments, the electronic component 18 is a single chip or combination of multiple chiplets that can comprise memory, central processing unit (CPU), a graphics processing unit (GPU), or/and application specific integrated circuit (ASIC), among other possibilities. Advantageously, the photonic chip package 10 may be a heterogeneously integrated chip package in which one or more chips or chiplets are assembled closely together (e.g., with spacings of tens of micrometers) to reduce electrical line length. In this way, the photonic chip package 10 provides a "system-in-package" with the same or improved functionality as compared to a "system-on-chip" but with reduced complexity and cost and increased yield. In the photonic chip package 10, the PIC 16 translates optical signals into electrical signals that are communicated to the electronic component 18 or translates electrical signals communicated from the electronic component 18 to optical signals.

The PIC 16 comprises a PIC waveguide 20 for receiving or transmitting optical signals into or out of the PIC 16. The glass substrate 100 has a glass waveguide 102 formed therein, and at an optical interface 21, the optical signals from the PIC waveguide 20 are exchanged with the glass waveguide 102. The glass waveguide 102 carries the optical signals to/from an optical connector 22, which is connected to an optical fiber 24. In this way, the optical fiber 24 may carry optical signals to the photonic chip package 10 that are translated by the PIC 16 into electrical signals, which may be used in the operation of the electronic component 18. Additionally, electrical signals may be forwarded by the electronic component 18 to the PIC 16, which translates the electrical signals into optical signals to be carried off of the photonic chip package 10 by the optical fiber 24.

In addition, the PIC 16 and the electronic component 18 may send and receive electrical signals through the glass substrate 100 to the PCB 12. To route the electrical signals, the photonic chip package 10 comprises a first set of redistribution layers (RDL) 26 and a second set of RDL 28 connected by through glass vias (TGV) 30. As can be seen in FIG. 1, the first set of RDL 26 and the second set of RDL 28 are disposed on opposite sides of the glass substrate 100. The first set of RDL 26 is disposed between the PCB 12 and the glass substrate 100, and the second set of RDL is disposed between the glass substrate 100 and the PIC 16 and electronic component 18. The first and second sets of RDL 26, 28 may each comprise one layer or multiple layers. The TGV 30 electrically connect the the first set of RDL 26 and the second set of RDL 28 through the thickness of the glass substrate 100. The first set of RDL 26 is electrically connected to the PCB 12 through the first BGA 14. Similarly, the second set of RDL 28 is electrically connected to the PIC 16 and the electronic component 18 through electrical micro-bumps 32 on which the PIC 16 and electrical component 18 are mounted.

The glass waveguide 102 provides for communication of optical signals onto and off of the photonic chip package 10. That is, the glass waveguide 102 is the connection between the PIC 16 and the optical connector 22 and optical fiber 24. As will be described more fully below, the glass waveguide 102 may be created through an ion exchange (IOX) process in which a core of higher refractive index material is formed within the glass substrate 100 to carry optical signals. The lower refractive index material of the glass substrate 100 acts as a cladding to guide the optical signals in the glass waveguide 102 by total internal reflection. In such embodiments, the core of higher refractive index material is formed by exchanging sodium and/or potassium ions in the glass material of the glass substrate 100 with silver ions. Notwithstanding, in one or more other embodiments, some or all of the glass waveguides 102 may instead be formed through laser writing techniques in which a laser is used to change the refractive index within the depth of the glass substrate 100.

For intensive environments, like data-center network switches, AI/ML computer clusters, and telecommunications equipment, the operational temperature of the photonic chip package 10 may be in the range of 50° C. to 110° C. These temperatures are sufficient to cause migration of the silver ions in the glass substrate 100 such that the waveguides formed through IOX diffuse out into the bulk of the glass substrate 100 over time, degrading bend loss and coupling performance to the optical fiber and the PIC. Electronics used in such environments are expected to have lifespans of at least five years (computing and networking applications) and up to fifteen years or more (telecommunications and radio applications). For various reasons, certain existing glass compositions are not suitable for use as the glass substrate 100 of a photonic chip package 10 in these environments. For example, certain glass compositions do not contain sufficient monovalent ions (such as sodium ions) to allow for the formation of waveguides through IOX. Additionally, other glass compositions that can undergo IOX allow for too much mobility of silver ions at the operational temperatures, drastically decreasing usable lifespan to only a matter of hours.

Figure 2A:
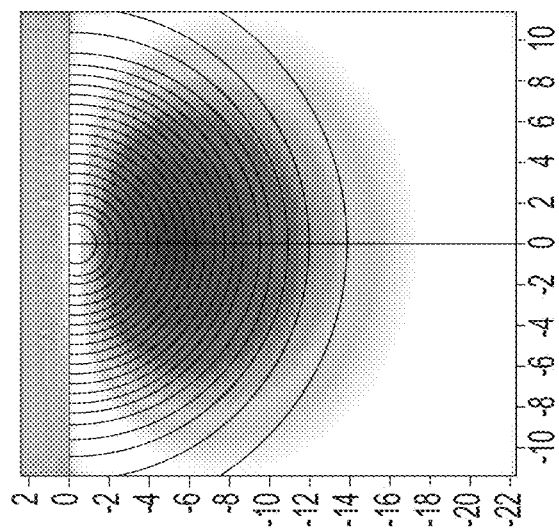
FIGS. 2A-2C depict a change in refractive index and core dimensions based on diffusion of silver ions of the waveguide, according to one or more embodiments.
Figure 2B:
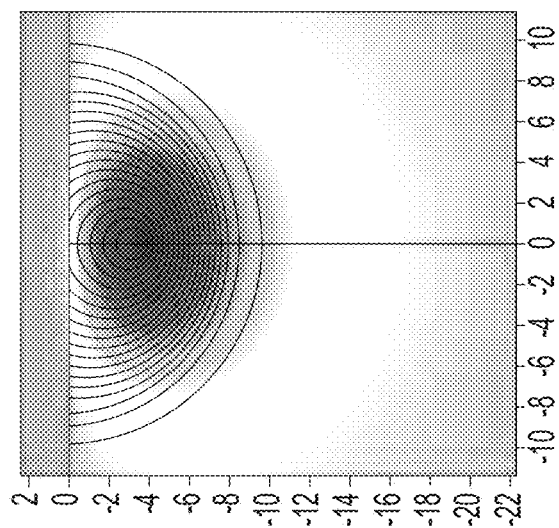
Figure 2C:
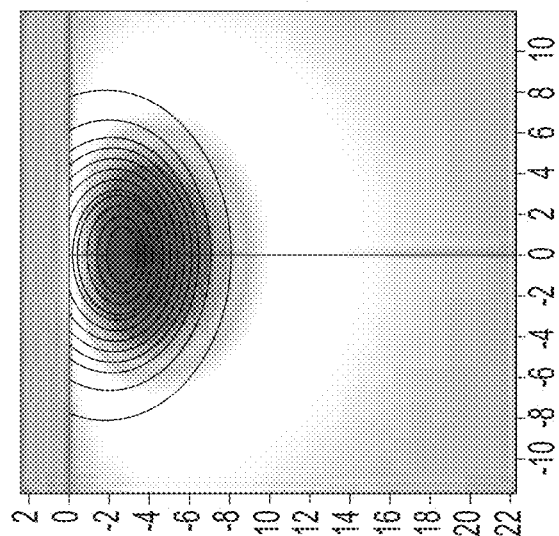

FIGS. 2A-2C demonstrate the effect of temperature on waveguide structure. FIG. 2A depicts the refractive index profile of a waveguide core having an initial refractive index change Δn of 0.005. If the composition of the glass substrate is not selected to reduce silver ion mobility at operational temperatures, the silver ions will diffuse out into the glass substrate, leading to an increase in core dimensions and a decrease in peak refractive index. FIG. 2B depicts a 5% drop in peak refractive index caused by diffusion of the silver ions within the glass substrate. As can be seen, the dimensions of the core are increased relative to the the core shown in FIG. 2A. The increased core dimensions and decreased peak refractive index led to a fiber coupling loss as a result of mode-mismatch to a single-mode optical fiber of 0.04 dB. FIG. 2C depicts a 50% drop in peak refractive index caused by diffusion of silver ions within the glass substrate. As can be seen, the dimensions of the core are greatly increased relative to the core shown in FIG. 2A and even relative to the core shown in FIG. 2B. The increased core dimensions and decreased peak refractive index led to a fiber coupling loss of 1.12 dB. Such high losses could prevent the receiver from recovering the optical signal and could lead to a failed optical link before reaching service lifespan.

To avoid such changes to the IOX waveguide core, Applicant has found that the diffusivity of silver ions in the glass composition is desirably less than $5 \times 10^{-19}$ m$^2$/s at operational temperature (55° C. to 110° C.). A photonic chip package 10 formed from a glass substrate with that level of silver ion diffusivity would be expected to have a service life of at least five years at an operational temperature as high as 110° C., making such a glass packaging substrate suitable for use in datacenter and telecommunication applications.

The diffusivity of silver ions in the glass substrate 100 relates not only to the temperature of the glass substrate 100 but also to the composition of the glass substrate 100. According to the present disclosure, the glass substrate 100 is formed from a glass composition comprising primarily $SiO_2$, $Al_2O_3$, $Na_2O$, and $Cs_2O/Rb_2O$, amongst other components, in the amounts discussed below.

In one or more embodiments, the glass substrate 100 is formed from a glass composition comprising $SiO_2$ in an amount in a range of 53 mol % to 84 mol %, in a range of 55 mol % to 84 mol %, in a range of 58 mol % to 84 mol %, in a range of 61 mol % to 84 mol %, in a range of 64 mol % to 84 mol %, in a range of 67 mol % to 84 mol %, in a range of 70 mol % to 84 mol %, in a range of 73 mol % to 84 mol %, in a range of 76 mol % to 84 mol %, in a range from 79 mol % to 84 mol %, in a range from 82 mol % to 84 mol %, in a range of 53 mol % to 82 mol %, in a range of 55 mol % to 82 mol %, in a range of 58 mol % to 82 mol %, in a range of 61 mol % to 82 mol %, in a range of 64 mol % to 82 mol %, in a range of 67 mol % to 82 mol %, in a range of 70 mol % to 82 mol %, in a range of 73 mol % to 82 mol %, in a range of 76 mol % to 82 mol %, in a range from 79 mol % to 82 mol %, in a range of 53 mol % to 79 mol %, in a range of 55 mol % to 79 mol %, in a range of 58 mol % to 79 mol %, in a range of 61 mol % to 79 mol %, in a range of 64 mol % to 79 mol %, in a range of 67 mol % to 79 mol %, in a range of 70 mol % to 79 mol %, in a range of 73 mol % to 79 mol %, in a range of 76 mol % to 79 mol %, in a range of 53 mol % to 76 mol %, in a range of 55 mol % to 76 mol %, in a range of 58 mol % to 76 mol %, in a range of 61 mol % to 76 mol %, in a range of 64 mol % to 76 mol %, in a range of 67 mol % to 76 mol %, in a range of 70 mol % to 76 mol %, in a range of 73 mol % to 76 mol %, in a range of 53 mol % to 73 mol %, in a range of 55 mol % to 73 mol %, in a range of 58 mol % to 73 mol %, in a range of 61 mol % to 73 mol %, in a range of 64 mol % to 73 mol %, in a range of 67 mol % to 73 mol %, in a range of 70 mol % to 73 mol %, in a range of 53 mol % to 70 mol %, in a range of 55 mol % to 70 mol %, in a range of 58 mol % to 70 mol %, in a range of 61 mol % to 70 mol %, in a range of 64 mol % to 70 mol %, in a range of 67 mol % to 70 mol %, in a range of 53 mol % to 67 mol %, in a range of 55 mol % to 67 mol %, in a range of 58 mol % to 67 mol %, in a range of 61 mol % to 67 mol %, in a range of 64 mol % to 67 mol %, in a range of 53 mol % to 64 mol %, in a range of 55 mol % to 64 mol %, in a range of 58 mol % to 64 mol %, in a range of 61 mol % to 64 mol %, in a range of 53 mol % to 61 mol %, in a range of 55 mol % to 61 mol %, in a range of 58 mol % to 61 mol %, in a range of 53 mol % to 58 mol %, in a range of 55 mol % to 58 mol %, or in a range of 53 mol % to 55 mol %. In one or more particular embodiments, the glass substrate 100 is formed from a glass composition comprising $SiO_2$ in an amount in a range of 65 mol % to 70 mol %. In the glass composition according to the present disclosure, $SiO_2$ is the main glass former and provides good durability and low thermal expansion. If the $SiO_2$ content is too high the glass may become difficult to melt. Further, at high $SiO_2$ content, the viscosity increases, and removal of bubbles and homogenizing of the glass may become more difficult.

In one or more embodiments, the glass substrate 100 is formed from a glass composition comprising $Al_2O_3$ in an amount in a range of 0.3 mol % to 20 mol %, in a range of 1 mol % to 20 mol %, in a range of 3 mol % to 20 mol %, in a range of 5 mol % to 20 mol %, in a range of 7 mol % to 20 mol %, in a range of 9 mol % to 20 mol %, in a range of 11 mol % to 20 mol %, in a range of 13 mol % to 20 mol %, in a range of 15 mol % to 20 mol %, in a range of 17 mol % to 20 mol %, in a range of 19 mol % to 20 mol %, in a range of 0.3 mol % to 18 mol %, in a range of 1 mol % to 18 mol %, in a range of 3 mol % to 18 mol %, in a range of 5 mol % to 18 mol %, in a range of 7 mol % to 18 mol %, in a range of 9 mol % to 18 mol %, in a range of 11 mol % to 18 mol %, in a range of 13 mol % to 18 mol %, in a range of 15 mol % to 18 mol %, in a range of 17 mol % to 18 mol %, in a range of 0.3 mol % to 16 mol %, in a range of 1 mol % to 16 mol %, in a range of 3 mol % to 16 mol %, in a range of 5 mol % to 16 mol %, in a range of 7 mol % to 16 mol %, in a range of 9 mol % to 16 mol %, in a range of 11 mol % to 16 mol %, in a range of 13 mol % to 16 mol %, in a range of 15 mol % to 16 mol %, in a range of 0.3 mol % to 14 mol %, in a range of 1 mol % to 14 mol %, in a range of 3 mol % to 14 mol %, in a range of 5 mol % to 14 mol %, in a range of 7 mol % to 14 mol %, in a range of 9 mol % to 14 mol %, in a range of 11 mol % to 14 mol %, in a range of 13 mol % to 14 mol %, in a range of 0.3 mol % to 12 mol %, in a range of 1 mol % to 12 mol %, in a range of 3 mol % to 12 mol %, in a range of 5 mol % to 12 mol %, in a range of 7 mol % to 12 mol %, in a range of 9 mol % to 12 mol %, in a range of 11 mol % to 12 mol %, in a range of 0.3 mol % to 10 mol %, in a range of 1 mol % to 10 mol %, in a range of 3 mol % to 10 mol %, in a range of 5 mol % to 10 mol %, in a range of 7 mol % to 10 mol %, in a range of 9 mol % to 10 mol %, in a range of 0.3 mol % to 8 mol %, in a range of 1 mol % to 8 mol %, in a range of 3 mol % to 8 mol %, in a range of 5 mol % to 8 mol %, in a range of 7 mol % to 8 mol %, in a range of 0.3 mol % to 6 mol %, in a range of 1 mol % to 6 mol %, in a range of 3 mol % to 6 mol %, in a range of 5 mol % to 6 mol %, in a range of 0.3 mol % to 4 mol %, in a range of 1 mol % to 4 mol %, in a range of 3 mol % to 4 mol %, in a range of 0.3 mol % to 2 mol %, in a range of 1 mol % to 2 mol %, or in a range of 0.3 mol % to 1 mol %. In one or more particular embodiments, the glass substrate 100 is formed from a glass composition comprising $Al_2O_3$ in an amount in a range of 0.3 mol % to 20 mol %, in particular 1 mol % to 20 mol %, more particularly 2 mol % to 16 mol %, still more particularly 2 mol % to 12 mol %, and most particularly 3 mol % to 6 mol %. In the glass composition according to the present disclosure, $Al_2O_3$ plays an important part in ion exchange as monovalent ions compensated with $Al_2O_3$ have good mobility. Further, $Al_2O_3$ helps to mitigate non-bridging oxygens (NBOs), which can enable reduction of $Ag^+$ ions to Ag metal. As compared to $Ag^+$ ions, Ag metal causes scattering, discoloration, and loss. If the $Al_2O_3$ content is too high, the viscosity increases, the $Ag^+$ ion mobility at operating temperatures may get too high, and the lifetime of $Ag^+$ waveguides may degrade.

In one or more embodiments, the glass substrate 100 is formed from a glass composition comprising $B_2O_3$ in an amount in a range of 0 mol % to 20 mol %, in a range of 0.25 mol % to 20 mol %, in a range of 1 mol % to 20 mol %, in a range of 3 mol % to 20 mol %, in a range of 5 mol % to 20 mol %, in a range of 7 mol % to 20 mol %, in a range of 9 mol % to 20 mol %, in a range of 11 mol % to 20 mol %, in a range of 13 mol % to 20 mol %, in a range of 15 mol % to 20 mol %, in a range of 17 mol % to 20 mol %, in a range of 19 mol % to 20 mol %, in a range of 0.25 mol % to 18 mol %, in a range of 1 mol % to 18 mol %, in a range of 3 mol % to 18 mol %, in a range of 5 mol % to 18 mol %, in a range of 7 mol % to 18 mol %, in a range of 9 mol % to 18 mol %, in a range of 11 mol % to 18 mol %, in a range of 13 mol % to 18 mol %, in a range of 15 mol % to 18 mol %, in a range of 17 mol % to 18 mol %, in a range of 0.25 mol % to 16 mol %, in a range of 1 mol % to 16 mol %, in a range of 3 mol % to 16 mol %, in a range of 5 mol % to 16 mol %, in a range of 7 mol % to 16 mol %, in a range of 9 mol % to 16 mol %, in a range of 11 mol % to 16 mol %, in a range of 13 mol % to 16 mol %, in a range of 15 mol % to 16 mol %, in a range of 0.25 mol % to 14 mol %, in a range of 1 mol % to 14 mol %, in a range of 3 mol % to 14 mol %, in a range of 5 mol % to 14 mol %, in a range of 7 mol % to 14 mol %, in a range of 9 mol % to 14 mol %, in a range of 11 mol % to 14 mol %, in a range of 13 mol % to 14 mol %, in a range of 0.25 mol % to 12 mol %, in a range of 1 mol % to 12 mol %, in a range of 3 mol % to 12 mol %, in a range of 5 mol % to 12 mol %, in a range of 7 mol % to 12 mol %, in a range of 9 mol % to 12 mol %, in a range of 11 mol % to 12 mol %, in a range of 0.25 mol % to 10 mol %, in a range of 1 mol % to 10 mol %, in a range of 3 mol % to 10 mol %, in a range of 5 mol % to 10 mol %, in a range of 7 mol % to 10 mol %, in a range of 9 mol % to 10 mol %, in a range of 0.25 mol % to 8 mol %, in a range of 1 mol % to 8 mol %, in a range of 3 mol % to 8 mol %, in a range of 5 mol % to 8 mol %, in a range of 7 mol % to 8 mol %, in a range of 0.25 mol % to 6 mol %, in a range of 1 mol % to 6 mol %, in a range of 3 mol % to 6 mol %, in a range of 5 mol % to 6 mol %, in a range of 0.25 mol % to 4 mol %, in a range of 1 mol % to 4 mol %, in a range of 3 mol % to 4 mol %, in a range of 0.25 mol % to 2 mol %, in a range of 1 mol % to 2 mol %, or in a range of 0.25 mol % to 1 mol %. In one or more particular embodiments, the glass substrate 100 may be free of $B_2O_3$ if the glass composition contains a total amount of MgO, CaO, and SrO of at least 1 mol % as will be discussed below. Otherwise, in one or more particular embodiments, the glass substrate 100 is formed from a composition comprising $B_2O_3$ in an amount in a range of 0.25 mol % to 16 mol %, in particular in a range of 4 mol % to 16 mol %, more particularly in a range from 4 mol % to 15 mol %, and most particularly in a range of 9 mol % to 11 mol %. In the glass composition according to the present disclosure, $B_2O_3$ also helps to consume NBOs and mitigate Ag metal precipitation. Further, $B_2O_3$ helps to slow down $Ag^+$ ion mobility at operating temperatures. However, if the level of $B_2O_3$ is too high, the durability of the glass suffers, and it takes longer to diffuse in waveguides.

In one or more embodiments, the glass substrate 100 is formed from a glass composition comprising $Na_2O$ in an amount in a range of 3 mol % to 16 mol %, in a range of 4 mol % to 16 mol %, in a range from 5 mol % to 16 mol %, in a range of 6 mol % to 16 mol %, in a range of 7 mol % to 16 mol %, in a range of 8 mol % to 16 mol %, in a range of 9 mol % to 16 mol %, in a range of 10 mol % to 16 mol %, in a range of 11 mol % to 16 mol %, in a range of 12 mol % to 16 mol %, in a range of 13 mol % to 16 mol %, in a range of 14 mol % to 16 mol %, in a range of 15 mol % to 16 mol %, 3 mol % to 15 mol %, in a range of 4 mol % to 15 mol %, in a range from 5 mol % to 15 mol %, in a range of 6 mol % to 15 mol %, in a range of 7 mol % to 15 mol %, in a range of 8 mol % to 15 mol %, in a range of 9 mol % to 15 mol %, in a range of 10 mol % to 15 mol %, in a range of 11 mol % to 15 mol %, in a range of 12 mol % to 15 mol %, in a range of 13 mol % to 15 mol %, in a range of 14 mol % to 15 mol %, 3 mol % to 14 mol %, in a range of 4 mol % to 14 mol %, in a range from 5 mol % to 14 mol %, in a range of 6 mol % to 14 mol %, in a range of 7 mol % to 14 mol %, in a range of 8 mol % to 14 mol %, in a range of 9 mol % to 14 mol %, in a range of 10 mol % to 14 mol %, in a range of 11 mol % to 14 mol %, in a range of 12 mol % to 14 mol %, in a range of 13 mol % to 14 mol %, 3 mol % to 13 mol %, in a range of 4 mol % to 13 mol %, in a range from 5 mol % to 13 mol %, in a range of 6 mol % to 13 mol %, in a range of 7 mol % to 13 mol %, in a range of 8 mol % to 13 mol %, in a range of 9 mol % to 13 mol %, in a range of 10 mol % to 13 mol %, in a range of 11 mol % to 13 mol %, in a range of 12 mol % to 13 mol %, in a range from 3 mol % to 12 mol %, in a 4 mol % to 12 mol %, in a range of 5 mol % to 12 mol %, in a range of 6 mol % to 12 mol %, in a range of 7 mol % to 12 mol %, in a range of 8 mol % to 12 mol %, in a range of 9 mol % to 12 mol %, in a range of 10 mol % to 12 mol %, in a range of 11 mol % to 12 mol %, in a range from 3 mol % to 11 mol %, in a range of 4 mol % to 11 mol %, in a range of 5 mol % to 11 mol %, in a range of 6 mol % to 11 mol %, in a range of 7 mol % to 11 mol %, in a range of 8 mol % to 11 mol %, in a range of 9 mol % to 11 mol %, in a range of 10 mol % to 11 mol %, in a range from 3 mol % to 10 mol %, in a range of 4 mol % to 10 mol %, in a range of 5 mol % to 10 mol %, in a range of 6 mol % to 10 mol %, in a range of 7 mol % to 10 mol %, in a range of 8 mol % to 10 mol %, in a range of 9 mol % to 10 mol %, in a range from 3 mol % to 9 mol %, in a range of 4 mol % to 9 mol %, in a range of 5 mol % to 9 mol %, in a range of 6 mol % to 9 mol %, in a range of 7 mol % to 9 mol %, in a range of 8 mol % to 9 mol %, in a range from 3 mol % to 8 mol %, in a range of 4 mol % to 8 mol %, in a range of 5 mol % to 8 mol %, in a range of 6 mol % to 8 mol %, in a range of 7 mol % to 8 mol %, in a range from 3 mol % to 7 mol %, in a range of 4 mol % to 7 mol %, in a range of 5 mol % to 7 mol %, in a range of 6 mol % to 7 mol %, in a range from 3 mol % to 6 mol %, in a range of 4 mol % to 6 mol %, in a range of 5 mol % to 6 mol %, in a range from 3 mol % to 5 mol %, in a range of 4 mol % to 5 mol %, or in a range from 3 mol % to 4 mol %. In one or more embodiments, the amount of MgO is limited to 5.3 mol % in order to provide $Na_2O$ above 13 mol % (i.e., in the range of 13 mol % to 16 mol %). In one or more particular embodiments, the glass substrate 100 is formed from a glass composition comprising $Na_2O$ in an amount in a range of 3 mol % to 16 mol %, in particular 4 mol % to 16 mol %, more particularly 6 mol % to 10 mol %. In the glass composition according to the present disclosure, $Na_2O$ is important for ion exchange because the $Na_2O$ provides the $Na^+$ ions that are primarily replaced with $Ag^+$ ion to increase refractive index and produce a waveguide. If the level of $Na_2O$ is too high and exceeds the sum of $Al_2O_3+B_2O_3+MgO$, then NBOs can be created and exacerbate Ag metal precipitation. High levels of $Na_2O$ may also decrease glass durability.

In one or more embodiments, the glass substrate 100 is formed from a glass composition comprising SrO in an amount in a range of 0 mol % to 10 mol %, in a range of 1 mol % to 10 mol %, in a range of 2 mol % to 10 mol %, in a range of 3 mol % to 10 mol %, in a range of 4 mol % to 10 mol %, in a range of 5 mol % to 10 mol %, in a range of 6 mol % to 10 mol %, in a range of 7 mol % to 10 mol %, in a range of 8 mol % to 10 mol %, in a range of 9 mol % to 10 mol %, 0 mol % to 9 mol %, in a range of 1 mol % to 9 mol %, in a range of 2 mol % to 9 mol %, in a range of 3 mol % to 9 mol %, in a range of 4 mol % to 9 mol %, in a range of 5 mol % to 9 mol %, in a range of 6 mol % to 9 mol %, in a range of 7 mol % to 9 mol %, in a range of 8 mol % to 9 mol %, 0 mol % to 8 mol %, in a range of 1 mol % to 8 mol %, in a range of 2 mol % to 8 mol %, in a range of 3 mol % to 8 mol %, in a range of 4 mol % to 8 mol %, in a range of 5 mol % to 8 mol %, in a range of 6 mol % to 8 mol %, in a range of 7 mol % to 8 mol %, in a range of 0 mol % to 7 mol %, in a range of 1 mol % to 7 mol %, in a range of 2 mol % to 7 mol %, 3 mol % to 7 mol %, in a range of 4 mol % to 7 mol %, in a range of 5 mol % to 7 mol %, in a range of 6 mol % to 7 mol %, in a range of 0 mol % to 6 mol %, in a range of 1 mol % to 6 mol %, in a range of 2 mol % to 6 mol %, in a range of 3 mol % to 6 mol %, in a range of 4 mol % to 6 mol %, in a range of 5 mol % to 6 mol %, in a range of 0 mol % to 5 mol %, in a range of 1 mol % to 5 mol %, in a range of 2 mol % to 5 mol %, in a range of 3 mol % to 5 mol %, in a range of 4 mol % to 5 mol %, in a range of 0 mol % to 4 mol %, in a range of 1 mol % to 4 mol %, in a range of 2 mol % to 4 mol %, in a range of 3 mol % to 4 mol %, in a range of 0 mol % to 3 mol %, in a range of 1 mol % to 3 mol %, in a range of 2 mol % to 3 mol %, in a range of 0 mol % to 2 mol %, in a range of 1 mol % to 2 mol %, or in a range of 0 mol % to 1 mol %. When included, in one or more embodiments, the glass substrate 100 is formed from a glass composition that comprises SrO in a range of 0.25 mol % to 7 mol %, in particular in a range of 3 mol % to 7 mol %. Further, as mentioned above, the glass substrate 100 may be free of $B_2O_3$ if the glass composition contains a total amount of MgO, CaO, and SrO of at least 1 mol %. In one or more embodiments, the total amount of MgO, CaO, and SrO is up to 16 mol % with the MgO, CaO, and SrO being limited individually by the respective ranges provided herein. Larger alkaline earth oxides like SrO and BaO are desirable to decrease $Ag^+$ ion diffusivity at operating temperatures. CaO is less effective for limiting $Ag^+$ ion diffusivity, and MgO is even less effective for this purpose. In one or more embodiments, total alkaline earth content is limited to maintain glass stability and prevent devitrification.

In one or more embodiments, the glass substrate 100 is formed from a glass composition comprising $Cs_2O$ in an amount in a range from 0.05 mol % to 8 mol %, in a range from 0.5 mol % to 8 mol %, in a range from 1 mol % to 8 mol %, in a range from 1.5 mol % to 8 mol %, in a range from 2 mol % to 8 mol %, in a range from 2.5 mol % to 8 mol %, in a range from 3 mol % to 8 mol %, in a range from 3.5 mol % to 8 mol %, in a range from 4 mol % to 8 mol %, in a range from 4.5 mol % to 8 mol %, in a range from 5 mol % to 8 mol %, in a range from 5.5 mol % to 8 mol %, in a range from 6 mol % to 8 mol %, in a range from 6.5 mol % to 8 mol %, in a range from 7 mol % to 8 mol %, in a range from 7.5 mol % to 8 mol %, in a range from 0.05 mol % to 7 mol %, in a range from 0.5 mol % to 7 mol %, in a range from 1 mol % to 7 mol %, in a range from 1.5 mol % to 7 mol %, in a range from 2 mol % to 7 mol %, in a range from 2.5 mol % to 7 mol %, in a range from 3 mol % to 7 mol %, in a range from 3.5 mol % to 7 mol %, in a range from 4 mol % to 7 mol %, in a range from 4.5 mol % to 7 mol %, in a range from 5 mol % to 7 mol %, in a range from 5.5 mol % to 7 mol %, in a range from 6 mol % to 7 mol %, in a range from 6.5 mol % to 7 mol %, in a range from 0.05 mol % to 6 mol %, in a range from 0.5 mol % to 6 mol %, in a range from 1 mol % to 6 mol %, in a range from 1.5 mol % to 6 mol %, in a range from 2 mol % to 6 mol %, in a range from 2.5 mol % to 6 mol %, in a range from 3 mol % to 6 mol %, in a range from 3.5 mol % to 6 mol %, in a range from 4 mol % to 6 mol %, in a range from 4.5 mol % to 6 mol %, in a range from 5 mol % to 6 mol %, in a range from 5.5 mol % to 6 mol %, in a range from 0.05 mol % to 5 mol %, in a range from 0.5 mol % to 5 mol %, in a range from 1 mol % to 5 mol %, in a range from 1.5 mol % to 5 mol %, in a range from 2 mol % to 5 mol %, in a range from 2.5 mol % to 5 mol %, in a range from 3 mol % to 5 mol %, in a range from 3.5 mol % to 5 mol %, in a range from 4 mol % to 5 mol %, in a range from 4.5 mol % to 5 mol %, in a range from 0.05 mol % to 4 mol %, in a range from 0.5 mol % to 4 mol %, in a range from 1 mol % to 4 mol %, in a range from 1.5 mol % to 4 mol %, in a range from 2 mol % to 4 mol %, in a range from 2.5 mol % to 4 mol %, in a range from 3 mol % to 4 mol %, in a range from 3.5 mol % to 4 mol %, in a range from 0.05 mol % to 3 mol %, in a range from 0.5 mol % to 3 mol %, in a range from 1 mol % to 3 mol %, in a range from 1.5 mol % to 3 mol %, in a range from 2 mol % to 3 mol %, in a range from 2.5 mol % to 3 mol %, in a range from 0.05 mol % to 2 mol %, in a range from 0.5 mol % to 2 mol %, in a range from 1 mol % to 2 mol %, in a range from 1.5 mol % to 2 mol %, in a range from 0.05 mol % to 1 mol %, in a range from 0.5 mol % to 1 mol %, or in a range from 0.05 mol % to 0.5 mol %. In one or more particular embodiments, the glass substrate 100 is formed from a glass composition comprising $Cs_2O$ in an amount of at least 0.25 mol %, in particular at least 0.35 mol %. In one or more embodiments, the glass substrate 100 is formed from a glass composition comprising $Cs_2O$ in an amount in a range from 1 mol % to 4 mol %. Additionally, in one or more embodiments, the glass substrate 100 is formed from a glass composition comprising a combination of $Cs_2O$ and $Rb_2O$ that are together in an amount of at least 0.05 mol % when SrO is present in an amount of at least 0.25 mol %. If SrO is not present, then the glass composition of the glass substrate 100 comprises at least 0.6 mol % of $Cs_2O$ and $Rb_2O$. $Cs_2O$ and $Rb_2O$ are very useful for slowing $Ag^+$ ion diffusivity through what is known to those skilled in the art as the mixed alkali effect. Monovalent ions like $Cs^+$ and $Rb^+$ are much bigger than $Ag^+$ and $Na^+$ ions but occupy the same sites in the glass and have very low mobility. Hence, they block the diffusion pathways of $Ag^+$ and $Na^+$. If the $Cs_2O$ and $Rb_2O$ contents are too high, then it takes a very long time to diffuse in the waveguide, and if their contents are too low, then the waveguide can diffuse away at operating temperatures.

In one or more embodiments, the glass substrate 100 is formed from a glass composition that further comprises one or more of MgO, $K_2O$, $Rb_2O$, CaO, ZnO, BaO, $TiO_2$, $Sb_2O_3$, $SnO_2$, $Y_2O_3$, $P_2O_5$, and $Li_2O$.

In one or more embodiments, the glass substrate 100 is formed from a glass composition that further comprises MgO in an amount in a range from 0 mol % to 8 mol %, in a range from 1 mol % to 8 mol %, in a range from 2 mol % to 8 mol %, in a range from 3 mol % to 8 mol %, in a range from 4 mol % to 8 mol %, in a range from 5 mol % to 8 mol %, in a range from 6 mol % to 8 mol %, in a range from 7 mol % to 8 mol %, in a range from 0 mol % to 7 mol %, in a range from 1 mol % to 7 mol %, in a range from 2 mol % to 7 mol %, in a range from 3 mol % to 7 mol %, in a range from 4 mol % to 7 mol %, in a range from 5 mol % to 7 mol %, in a range from 6 mol % to 7 mol %, in a range from 0 mol % to 6 mol %, in a range from 1 mol % to 6 mol %, in a range from 2 mol % to 6 mol %, in a range from 3 mol % to 6 mol %, in a range from 4 mol % to 6 mol %, in a range from 5 mol % to 6 mol %, in a range from 0 mol % to 5 mol %, in a range from 1 mol % to 5 mol %, in a range from 2 mol % to 5 mol %, in a range from 3 mol % to 5 mol %, in a range from 4 mol % to 5 mol %, in a range from 0 mol % to 4 mol %, in a range from 1 mol % to 4 mol %, in a range from 2 mol % to 4 mol %, in a range from 3 mol % to 4 mol %, in a range from 0 mol % to 3 mol %, in a range from 1 mol % to 3 mol %, in a range from 2 mol % to 3 mol %, in a range from 0 mol % to 2 mol %, in a range from 1 mol % to 2 mol %, or in a range from 0 mol % to 1 mol %. In one or more particular embodiments, the glass substrate is formed from a glass composition that further comprises MgO in an amount in a range from 1 mol % to 3 mol %. Further, as mentioned above, if the amount of $Na_2O$ is provided in an amount of 13 mol % or more, then the glass composition of the glass substrate 100 comprises 5.3 mol % of MgO or less. Further, as mentioned above, the glass substrate 100 may be free of $B_2O_3$ if the glass composition contains a total amount of MgO, CaO, and SrO of at least 1 mol %, and the total amount of MgO, CaO, and SrO is up to 16 mol % with the MgO, CaO, and SrO being limited individually by the respective ranges provided herein.

In one or more embodiments, the glass substrate 100 is formed from a glass composition that further comprises $K_2O$ in an amount in a range from 0 mol % to 8 mol %, in a range from 1 mol % to 8 mol %, in a range from 2 mol % to 8 mol %, in a range from 3 mol % to 8 mol %, in a range from 4 mol % to 8 mol %, in a range from 5 mol % to 8 mol %, in a range from 6 mol % to 8 mol %, in a range from 7 mol % to 8 mol %, in a range from 0 mol % to 7 mol %, in a range from 1 mol % to 7 mol %, in a range from 2 mol % to 7 mol %, in a range from 3 mol % to 7 mol %, in a range from 4 mol % to 7 mol %, in a range from 5 mol % to 7 mol %, in a range from 6 mol % to 7 mol %, in a range from 0 mol % to 6 mol %, in a range from 1 mol % to 6 mol %, in a range from 2 mol % to 6 mol %, in a range from 3 mol % to 6 mol %, in a range from 4 mol % to 6 mol %, in a range from 5 mol % to 6 mol %, in a range from 0 mol % to 5 mol %, in a range from 1 mol % to 5 mol %, in a range from 2 mol % to 5 mol %, in a range from 3 mol % to 5 mol %, in a range from 4 mol % to 5 mol %, in a range from 0 mol % to 4 mol %, in a range from 1 mol % to 4 mol %, in a range from 2 mol % to 4 mol %, in a range from 3 mol % to 4 mol %, in a range from 0 mol % to 3 mol %, in a range from 1 mol % to 3 mol %, in a range from 2 mol % to 3 mol %, in a range from 0 mol % to 2 mol %, in a range from 1 mol % to 2 mol %, or in a range from 0 mol % to 1 mol %. In one or more particular embodiments, the glass substrate is formed from a glass composition that further comprises $K_2O$ in an amount up to 4.5 mol %.

In one or more embodiments, the glass substrate 100 is formed from a glass composition that further comprises CaO in an amount in a range of 0 mol % to 15 mol %, in a range of 1 mol % to 15 mol %, in a range of 2 mol % to 15 mol %, 3 mol % to 15 mol %, in a range of 4 mol % to 15 mol %, in a range from 5 mol % to 15 mol %, in a range of 6 mol % to 15 mol %, in a range of 7 mol % to 15 mol %, in a range of 8 mol % to 15 mol %, in a range of 9 mol % to 15 mol %, in a range of 10 mol % to 15 mol %, in a range of 11 mol % to 15 mol %, in a range of 12 mol % to 15 mol %, in a range of 13 mol % to 15 mol %, in a range of 14 mol % to 15 mol %, in a range of 0 mol % to 14 mol %, in a range of 1 mol % to 14 mol %, in a range of 2 mol % to 14 mol %, 3 mol % to 14 mol %, in a range of 4 mol % to 14 mol %, in a range from 5 mol % to 14 mol %, in a range of 6 mol % to 14 mol %, in a range of 7 mol % to 14 mol %, in a range of 8 mol % to 14 mol %, in a range of 9 mol % to 14 mol %, in a range of 10 mol % to 14 mol %, in a range of 11 mol % to 14 mol %, in a range of 12 mol % to 14 mol %, in a range of 13 mol % to 14 mol %, in a range of 0 mol % to 13 mol %, in a range of 1 mol % to 13 mol %, in a range of 2 mol % to 13 mol %, 3 mol % to 13 mol %, in a range of 4 mol % to 13 mol %, in a range from 5 mol % to 13 mol %, in a range of 6 mol % to 13 mol %, in a range of 7 mol % to 13 mol %, in a range of 8 mol % to 13 mol %, in a range of 9 mol % to 13 mol %, in a range of 10 mol % to 13 mol %, in a range of 11 mol % to 13 mol %, in a range of 12 mol % to 13 mol %, in a range of 0 mol % to 12 mol %, in a range of 1 mol % to 12 mol %, in a range of 2 mol % to 12 mol %, in a range from 3 mol % to 12 mol %, in a 4 mol % to 12 mol %, in a range of 5 mol % to 12 mol %, in a range of 6 mol % to 12 mol %, in a range of 7 mol % to 12 mol %, in a range of 8 mol % to 12 mol %, in a range of 9 mol % to 12 mol %, in a range of 10 mol % to 12 mol %, in a range of 11 mol % to 12 mol %, in a range of 0 mol % to 11 mol %, in a range of 1 mol % to 11 mol %, in a range of 2 mol % to 11 mol %, in a range from 3 mol % to 11 mol %, in a range of 4 mol % to 11 mol %, in a range of 5 mol % to 11 mol %, in a range of 6 mol % to 11 mol %, in a range of 7 mol % to 11 mol %, in a range of 8 mol % to 11 mol %, in a range of 9 mol % to 11 mol %, in a range of 10 mol % to 11 mol %, in a range of 0 mol % to 10 mol %, in a range of 1 mol % to 10 mol %, in a range of 2 mol % to 10 mol %, in a range from 3 mol % to 10 mol %, in a range of 4 mol % to 10 mol %, in a range of 5 mol % to 10 mol %, in a range of 6 mol % to 10 mol %, in a range of 7 mol % to 10 mol %, in a range of 8 mol % to 10 mol %, in a range of 9 mol % to 10 mol %, in a range of 0 mol % to 9 mol %, in a range of 1 mol % to 9 mol %, in a range of 2 mol % to 9 mol %, in a range from 3 mol % to 9 mol %, in a range of 4 mol % to 9 mol %, in a range of 5 mol % to 9 mol %, in a range of 6 mol % to 9 mol %, in a range of 7 mol % to 9 mol %, in a range of 8 mol % to 9 mol %, in a range of 0 mol % to 8 mol %, in a range of 1 mol % to 8 mol %, in a range of 2 mol % to 8 mol %, in a range from 3 mol % to 8 mol %, in a range of 4 mol % to 8 mol %, in a range of 5 mol % to 8 mol %, in a range of 6 mol % to 8 mol %, in a range of 7 mol % to 8 mol %, in a range of 0 mol % to 7 mol %, in a range of 1 mol % to 7 mol %, in a range of 2 mol % to 7 mol %, in a range from 3 mol % to 7 mol %, in a range of 4 mol % to 7 mol %, in a range of 5 mol % to 7 mol %, in a range of 6 mol % to 7 mol %, in a range of 0 mol % to 6 mol %, in a range of 1 mol % to 6 mol %, in a range of 2 mol % to 6 mol %, in a range from 3 mol % to 6 mol %, in a range of 4 mol % to 6 mol %, in a range of 5 mol % to 6 mol %, in a range of 0 mol % to 5 mol %, in a range of 1 mol % to 5 mol %, in a range of 2 mol % to 5 mol %, in a range from 3 mol % to 5 mol %, in a range of 4 mol % to 5 mol %, in a range of 0 mol % to 4 mol %, in a range of 1 mol % to 4 mol %, in a range of 2 mol % to 4 mol %, in a range from 3 mol % to 4 mol %, in a range of 0 mol % to 3 mol %, in a range of 1 mol % to 3 mol %, in a range of 2 mol % to 3 mol %, in a range of 0 mol % to 2 mol %, in a range of 1 mol % to 2 mol %, or in a range of 0 mol % to 1 mol %. In one or more particular embodiments, the glass substrate is formed from a glass composition that further comprises CaO in an amount up to 8 mol %. Further, as mentioned above, the glass substrate 100 may be free of $B_2O_3$ if the glass composition contains a total amount of MgO, CaO, and SrO of at least 1 mol %, and the total amount of MgO, CaO, and SrO is up to 16 mol % with the MgO, CaO, and SrO being limited individually by the respective ranges provided herein.

In one or more embodiments, the glass substrate 100 is formed from a glass composition that further comprises BaO in an amount in a range from 0 mol % to 8 mol %, in a range from 1 mol % to 8 mol %, in a range from 2 mol % to 8 mol %, in a range from 3 mol % to 8 mol %, in a range from 4 mol % to 8 mol %, in a range from 5 mol % to 8 mol %, in a range from 6 mol % to 8 mol %, in a range from 7 mol % to 8 mol %, in a range from 0 mol % to 7 mol %, in a range from 1 mol % to 7 mol %, in a range from 2 mol % to 7 mol %, in a range from 3 mol % to 7 mol %, in a range from 4 mol % to 7 mol %, in a range from 5 mol % to 7 mol %, in a range from 6 mol % to 7 mol %, in a range from 0 mol % to 6 mol %, in a range from 1 mol % to 6 mol %, in a range from 2 mol % to 6 mol %, in a range from 3 mol % to 6 mol %, in a range from 4 mol % to 6 mol %, in a range from 5 mol % to 6 mol %, in a range from 0 mol % to 5 mol %, in a range from 1 mol % to 5 mol %, in a range from 2 mol % to 5 mol %, in a range from 3 mol % to 5 mol %, in a range from 4 mol % to 5 mol %, in a range from 0 mol % to 4 mol %, in a range from 1 mol % to 4 mol %, in a range from 2 mol % to 4 mol %, in a range from 3 mol % to 4 mol %, in a range from 0 mol % to 3 mol %, in a range from 1 mol % to 3 mol %, in a range from 2 mol % to 3 mol %, in a range from 0 mol % to 2 mol %, in a range from 1 mol % to 2 mol %, or in a range from 0 mol % to 1 mol %. As mentioned above, BaO can be used to lower Ag$^+$ ion diffusivity at operating temperatures. However, for various reasons, such as toxicity and expense, other oxides may be used in place of BaO in certain embodiments.

In one or more embodiments, the glass substrate 100 is formed from a glass composition that further comprises ZnO in an amount in a range from 0 mol % to 8 mol %, in a range from 1 mol % to 8 mol %, in a range from 2 mol % to 8 mol %, in a range from 3 mol % to 8 mol %, in a range from 4 mol % to 8 mol %, in a range from 5 mol % to 8 mol %, in a range from 6 mol % to 8 mol %, in a range from 7 mol % to 8 mol %, in a range from 0 mol % to 7 mol %, in a range from 1 mol % to 7 mol %, in a range from 2 mol % to 7 mol %, in a range from 3 mol % to 7 mol %, in a range from 4 mol % to 7 mol %, in a range from 5 mol % to 7 mol %, in a range from 6 mol % to 7 mol %, in a range from 0 mol % to 6 mol %, in a range from 1 mol % to 6 mol %, in a range from 2 mol % to 6 mol %, in a range from 3 mol % to 6 mol %, in a range from 4 mol % to 6 mol %, in a range from 5 mol % to 6 mol %, in a range from 0 mol % to 5 mol %, in a range from 1 mol % to 5 mol %, in a range from 2 mol % to 5 mol %, in a range from 3 mol % to 5 mol %, in a range from 4 mol % to 5 mol %, in a range from 0 mol % to 4 mol %, in a range from 1 mol % to 4 mol %, in a range from 2 mol % to 4 mol %, in a range from 3 mol % to 4 mol %, in a range from 0 mol % to 3 mol %, in a range from 1 mol % to 3 mol %, in a range from 2 mol % to 3 mol %, in a range from 0 mol % to 2 mol %, in a range from 1 mol % to 2 mol %, or in a range from 0 mol % to 1 mol %.

In one or more embodiments, the glass substrate 100 is formed from a glass composition that further comprises Rb$_2$O in an amount in a range from 0 mol % to 8 mol %, in a range from 1 mol % to 8 mol %, in a range from 2 mol % to 8 mol %, in a range from 3 mol % to 8 mol %, in a range from 4 mol % to 8 mol %, in a range from 5 mol % to 8 mol %, in a range from 6 mol % to 8 mol %, in a range from 7 mol % to 8 mol %, in a range from 0 mol % to 7 mol %, in a range from 1 mol % to 7 mol %, in a range from 2 mol % to 7 mol %, in a range from 3 mol % to 7 mol %, in a range from 4 mol % to 7 mol %, in a range from 5 mol % to 7 mol %, in a range from 6 mol % to 7 mol %, in a range from 0 mol % to 6 mol %, in a range from 1 mol % to 6 mol %, in a range from 2 mol % to 6 mol %, in a range from 3 mol % to 6 mol %, in a range from 4 mol % to 6 mol %, in a range from 5 mol % to 6 mol %, in a range from 0 mol % to 5 mol %, in a range from 1 mol % to 5 mol %, in a range from 2 mol % to 5 mol %, in a range from 3 mol % to 5 mol %, in a range from 4 mol % to 5 mol %, in a range from 0 mol % to 4 mol %, in a range from 1 mol % to 4 mol %, in a range from 2 mol % to 4 mol %, in a range from 3 mol % to 4 mol %, in a range from 0 mol % to 3 mol %, in a range from 1 mol % to 3 mol %, in a range from 2 mol % to 3 mol %, in a range from 0 mol % to 2 mol %, in a range from 1 mol % to 2 mol %, or in a range from 0 mol % to 1 mol %. In one or more particular embodiments, the glass substrate is formed from a glass composition that further comprises Rb$_2$O in an amount up to 6 mol %, in particular in an amount up to 4 mol %. Further, as mentioned above, when the glass substrate is formed from a glass composition that comprises SrO in an amount of at least 0.25 mol %, the glass composition may contain Rb$_2$O and Cs$_2$O together or interchangeably in an amount up to 0.05 to 8 mol %. If the glass composition does not contain SrO, then the glass composition preferably contains at least 0.6 mol % of Rb$_2$O and Cs$_2$O when provided in combination or interchangeably.

In one or more embodiments, the glass substrate 100 is formed from a glass composition that further comprises Li$_2$O in an amount in a range from 0 mol % to 4 mol %, in a range from 1 mol % to 4 mol %, in a range from 2 mol % to 4 mol %, in a range from 3 mol % to 4 mol %, in a range from 0 mol % to 3 mol %, in a range from 1 mol % to 3 mol %, in a range from 2 mol % to 3 mol %, in a range from 0 mol % to 2 mol %, in a range from 1 mol % to 2 mol %, or in a range from 0 mol % to 1 mol %.

In one or more embodiments, the glass substrate 100 is formed from a glass composition that further comprises at least one of TiO$_2$, Sb$_2$O$_3$, or Y$_2$O$_3$, each in an amount in a range from 0 mol % to 4 mol %, in a range from 1 mol % to 4 mol %, in a range from 2 mol % to 4 mol %, in a range from 3 mol % to 4 mol %, in a range from 0 mol % to 3 mol %, in a range from 1 mol % to 3 mol %, in a range from 2 mol % to 3 mol %, in a range from 0 mol % to 2 mol %, in a range from 1 mol % to 2 mol %, or in a range from 0 mol % to 1 mol %.

In one or more embodiments, the glass substrate 100 is formed from a glass composition that further comprises P$_2$O$_5$ in an amount in a range from 0 mol % to 5 mol %, in a range from 1 mol % to 5 mol %, in a range from 2 mol % to 5 mol %, in a range from 3 mol % to 5 mol %, in a range from 4 mol % to 5 mol %, in a range from 0 mol % to 4 mol %, in a range from 1 mol % to 4 mol %, in a range from 2 mol % to 4 mol %, in a range from 3 mol % to 4 mol %, in a range from 0 mol % to 3 mol %, in a range from 1 mol % to 3 mol %, in a range from 2 mol % to 3 mol %, in a range from 0 mol % to 2 mol %, in a range from 1 mol % to 2 mol %, or in a range from 0 mol % to 1 mol %. In one or more particular embodiments, the glass substrate 100 is formed from a glass composition that further comprises P$_2$O$_5$ in an amount of up to 4 mol %.

In one or more embodiments, the glass substrate 100 is formed form a glass composition that further comprises SnO$_2$ in an amount in a range from 0 mol % to 1 mol % or 0.25 mol % to 0.75 mol %.

In one or more embodiments, the glass substrate 100 is formed from a glass composition that is substantially free from the multivalent metals of Fe, Cr, Ni, Cu, and As. As used herein, "substantially free" means that the total amount of each multivalent metal ion is 0.5 mol % or less, in particular 0.05 mol % or less, and most particularly 0.005 mol % or less. The amount of trace metals can be controlled by using high purity starting materials for forming the glass and by preventing the glass material from coming into contact with processing equipment from which the glass material could absorb such trace metals. These metal oxides also cause optical absorption which is deleterious to light propagation, so should be minimized. By removing trace metals, the possibility of reducing the silver ions (Ag$^+$) to elemental silver (Ag$^0$) is diminished. Elemental silver in the glass substrate could create scattering centers, which are not conducive to the operation of the waveguide.

Additionally, in one or more embodiments, the glass substrate 100 is formed from a glass composition that is substantially free of water (in particular, in the form of dissolved OH$^-$ ions). As used herein, "substantially free" means that the amount of water is 0.1 wt % or less. In one or more embodiments, water can be removed from the glass by adding reducing agents and halides during melting.

The glass composition described herein can be fabricated using a fusion draw process to produce thin glass sheets without the need for post-processing of the glass sheet surfaces. In this way, the glass substrate can be processed cost-effectively at the panel level to provide large glass substrates for optical backplanes and optical motherboards of sizes up to 610 mm×610 mm, for example. Notwithstanding, the glass composition may also be fabricated into glass substrates using other techniques, such as float techniques or slot draw techniques.

Further, the glass composition is suitable for forming smaller volumes of glass substrates on the wafer level. For example, the glass composition may be processed into wafers having diameters of, e.g., 150 mm, 200 mm, or 300 mm, among other sizes. In one or more embodiments, the glass composition may be melted in crucible tanks and formed by pressing into discs that can be diced and polished. In one or more embodiments, the wafers or substrates 100 may be diced or singulated using laser singulation techniques.

Glass substrates produced from the glass composition described herein have a high optical transmission (e.g., transmittance of 90% or greater, 95% or greater, or 97% or greater) in the wavelength range of 800 nm to 1600 nm, in particular in the O-band (1260 nm to 1360 nm) and/or the C-band (1530 nm to 1565 nm), resulting in low loss optical waveguides with propagation loss of less than 1 dB/cm, preferably less than 0.1 dB/cm, and in particular less than 0.05 dB/cm. In one or more embodiments, the propagation loss is in a range from 0.000 dB/cm to 0.100 dB/cm.

The glass composition described above is particularly suitable for use in a silver-sodium (Ag—Na) IOX process to produce a glass substrate 100 of a glass packaing substrate 10. Specifically, the glass substrate 100 produced through the IOX process can have a glass waveguide 102 formed therein having a low diffusivity of silver ions at operational temperatures in the range of 50° C. to 110° C. The Ag—Na IOX process for forming waveguides 102 will be described in the following paragraphs.

Applicant has experimentally determined that IOX of sodium ions (Na$^+$) of the glass substrate 100 with silver ions (Ag$^+$) produce the best performing waveguides 102 (referred to hereinbelow as "Ag—Na IOX waveguides"). In particular, because of the relatively small radius of the Ag$^+$ ion, the compressive stress resulting from the IOX process, which gives rise to birefringence, is less than that for other ions that can be exchanged using an IOX process, such as potassium ions (K$^+$).

Measurements on Ag—Na IOX waveguides formed in the glass substrate indicate that the magnitude of the birefringence |B| at the waveguide surface for Ag—Na IOX waveguides is |B|<0.001, as compared to greater than 0.002 for waveguides formed using a potassium-sodium (K—Na) IOX process in the same glass. Such a small amount for the birefringence magnitude |B| is important for IOX waveguides when forming optical interconnects to reduce the polarization dependent coupling loss.

Additionally, measurements of the compressive stress in glasses indicated that the Ag—Na IOX process generates 5× less compressive stress than the K—Na IOX process in the same glass. Suitable depths of layer DOL of up to 80 µm, in particular in a range from 45 µm and 80 µm, for multimode transmission and up to 15 µm, in particular in a range from 4 µm and 15 µm, for single mode transmission can also be obtained using the Ag—Na IOX process.

FIGS. 3A through 3E are cross-sectional views of the example glass substrate 100 of FIG. 1 that show an example method of forming low-loss Ag—Na IOX waveguides 102 as disclosed herein. The glass substrate 100 comprises the glass composition as described above.

Figure 3A:
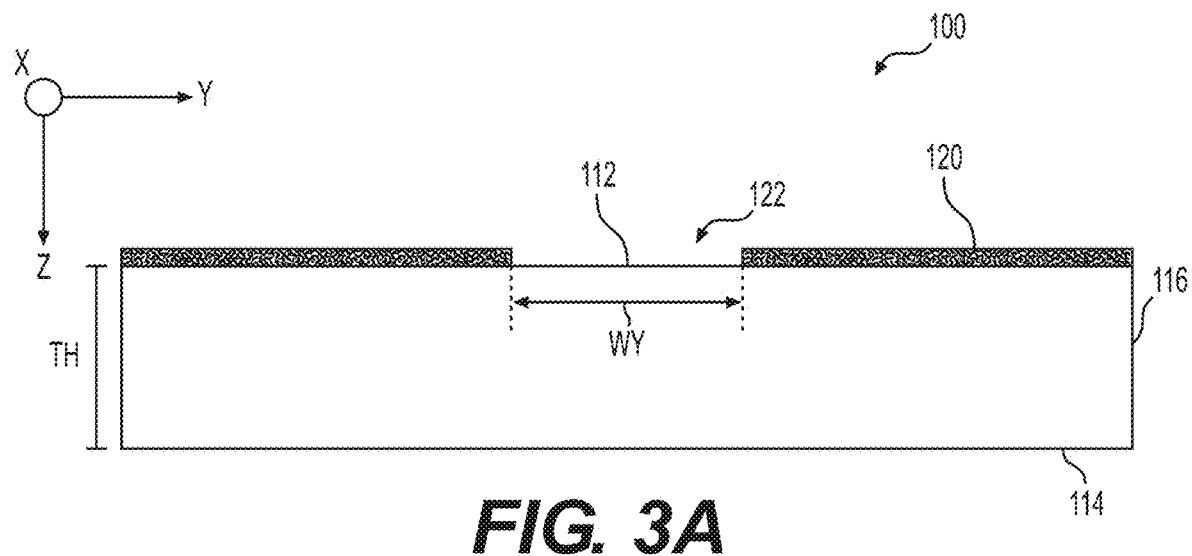
FIGS. 3A-3E depict a method of ion exchanging sodium ions of the glass substrate for silver ions to form a waveguide, according to one or more embodiments.

FIG. 3A shows the glass substrate 100 having a first major surface 112 and a second major surface 114. The second major surface 114 is opposite to the first major surface 112. The glass substrate 100 has a thickness TH defined as a distance between the first major surface 112 and the second major surface 114. A minor surface 116 connects the first major surface 112 to the second major surface 114 around a periphery of the glass substrate 100.

As shown in FIG. 3A, a mask 120 is applied to the first major surface 12 of the glass substrate. The mask 120 comprises an aperture 122 that is open to the first major surface 112. The mask 120 can be formed from a material that does not substantially diffuse into the glass substrate 100. Example materials comprise aluminum, titanium and silicon dioxide. In an example, the aperture 122 can extend in the y-direction (with respect to the axis shown in FIG. 3A) to define an elongate opening, e.g., a slot opening. In one or more embodiments, the aperture 122 has a width WY in a range from 1 µm to 10 µm for forming single mode Ag—Na IOX waveguides, and a width WY in a range from 10 µm to 50 µm for forming multimode Ag—Na IOX waveguides.

In an example, the glass substrate 100 can comprise alignment features (not shown), such as markers or fiducials, that can be added during the mask-forming process and that remain in place after the IOX process and mask removal is completed. Such alignment features can have a very high position accuracy and be formed to have excellent visibility for visual alignment (including machine-vision alignment) of additional components.

Figure 3B:
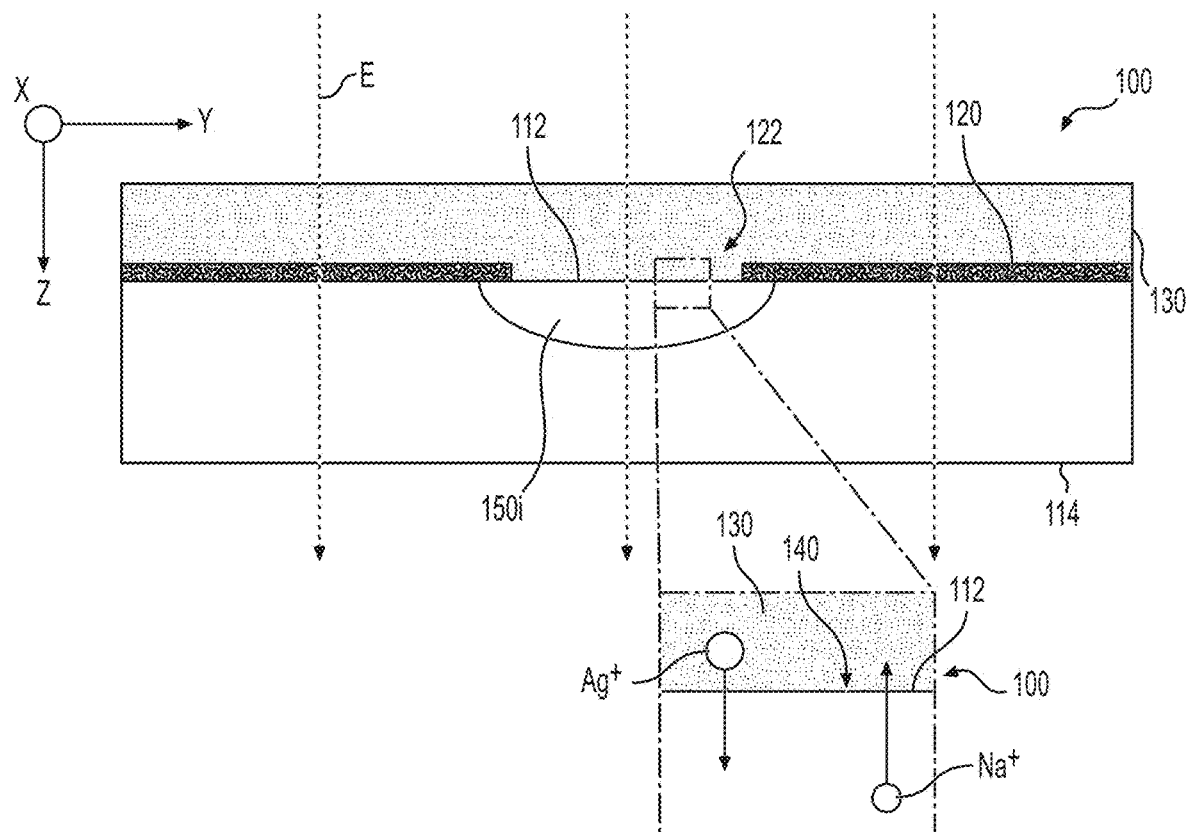

FIG. 3B is similar to FIG. 3A and shows a silver salt bath 130 atop the glass substrate 100 and covering the mask 120 and the exposed first major surface 112 at the aperture 122 as part of a first or "step 1" diffusion. In some embodiments, the silver salt bath 130 comprises AgNO$_3$. Example IOX parameters for the Ag—Na IOX process can comprise a diffusion temperature T$_D$ in the range from 250° C. to 400° C., a silver concentration C$_{Ag}$ in the range from 1 wt % to 25 wt % (in particular 15 wt % AgNO$_3$ or less), and a diffusion time t$_D$ in the range from 10 minutes (min) to 200 hours (h). In one or more embodiments, an optional electrical field E can be used to make the IOX process field assisted, as is known in the art.

The step 1 diffusion involves an Ag—Na IOX process in which Ag$^+$ ions in the silver salt bath 130 are exchanged for Na$^+$ ions in the glass substrate 100. That is, Ag$^+$ ions that are external to the glass substrate 100 are exchanged for Na$^+$ ions that are internal to the glass substrate 100 and that are part of glass matrix that makes up the glass substrate 100. The exchange of the ions is schematically illustrated in the close-up inset of FIG. 3B that shows an IOX interface 140 at the first major surface 112 of the glass substrate 100.

Figure 3C:
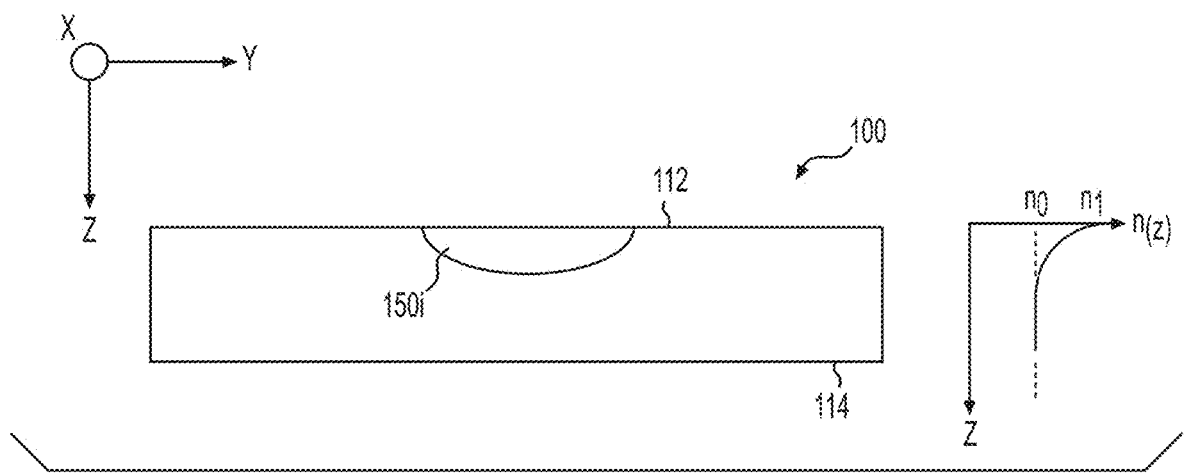

FIG. 3C shows the resulting Ag—Na IOX glass substrate 100 in which the mask 120 has been removed and in which the Ag—Na IOX process of the step 1 diffusion has created an initial Ag—Na IOX region 150$i$ aligned with the previous location of the aperture 122 of the mask 120. The initial Ag—Na IOX region 150$i$ has an initial refractive index profile n(z) that has a maximum value n$_1$ at the first major surface 112 of the glass substrate 199 (i.e., n$_s$=n$_1$) and that monotonically decreases with distance (depth) z into the glass substrate 100 until it reaches the bulk refractive index n$_0$. The (maximum) change in refractive index Δn=n$_1$−n$_0$. In one or more embodiments the maximum change in refractive index Δn is at least 0.015, in particular at least 0.02 and may be in a range from 0.015 to 0.040.

Figure 3D:
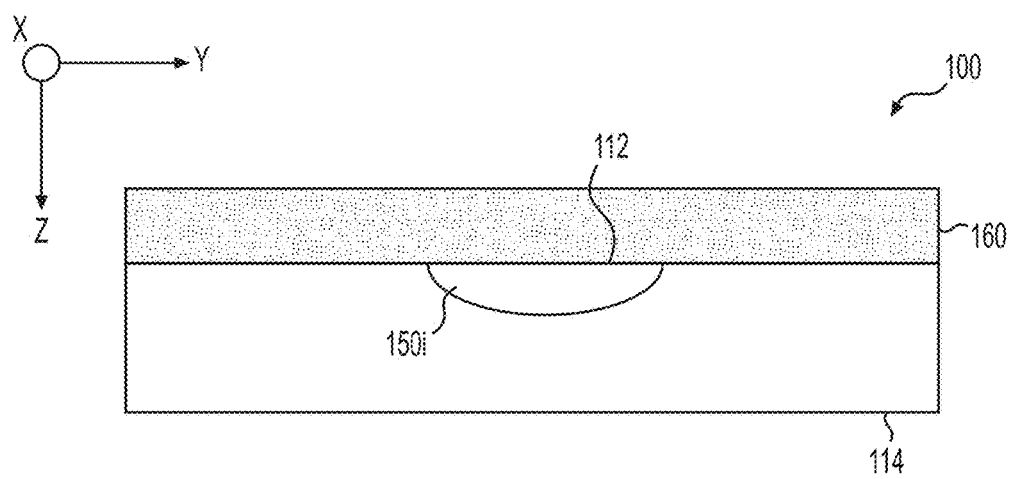

FIG. 3D shows the next step (i.e., a step 2 diffusion) in the IOX process, which includes providing a sodium salt bath 160 (e.g., NaNO$_3$) to the first major surface 112 of the glass substrate 100 and in particular to the initial Ag—Na IOX region 150i to perform an Na—Ag IOX process. Example Na—Ag IOX parameters for this step include a diffusion temperature $T_D$ in the range from 250° C. to 400° C. and a diffusion time $t_D$ in the range from 5 min to 96 h. In one or more embodiments, this IOX process can be field assisted.

Figure 3E:
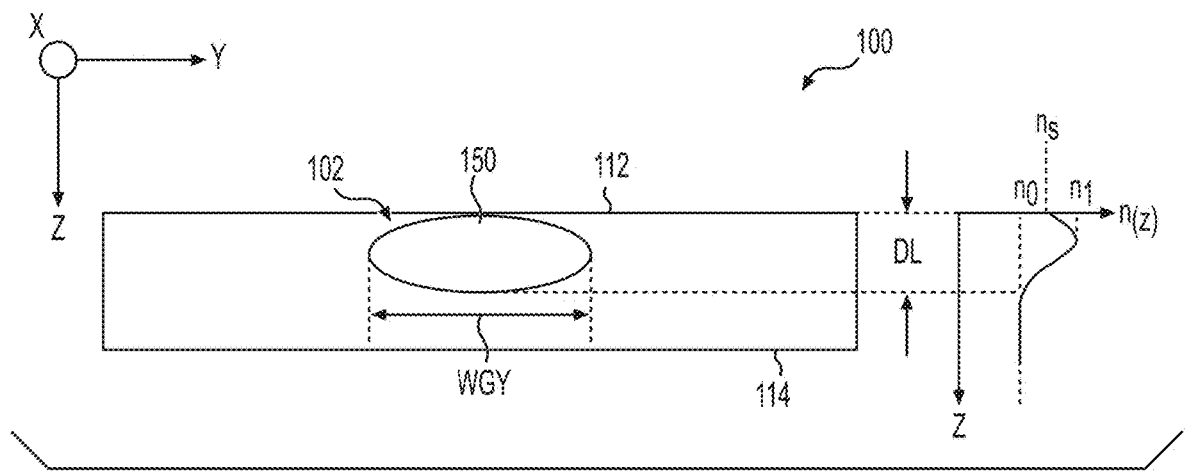

The step 2 diffusion employing the Na—Ag IOX process of FIG. 3D causes the $Ag^+$ ions close with the glass substrate 100 and close to the first major surface 112 to exchange with the $Na^+$ ions in the sodium salt bath 160. The result of this process is shown in FIG. 3E in which the initial Ag—Na IOX region 150i has been converted by the Na—Ag IOX process to a final Ag—Na IOX region 150 that is "buried," i.e., has a refractive index profile with its maximum value $n_1$ residing below the first major surface 112. That is, the refractive index $n_s$ at the first major surface 112 is less than the maximum refractive index $n_1$ within the depth of the glass substrate 100. In one or more embodiments, this may cause the entire waveguide 102 to be disposed below the first major surface 112. However, in one or more embodiments, at least a portion of the waveguide 102 may reside at the first major surface 112.

In an example, the final Ag—Na IOX region 150 extends in the X-direction and defines a core of an Ag—Na IOX waveguide 102, which is also defined by the bulk glass composition containing Na ions in a portion of the glass substrate 100 immediately surrounding the final Ag—Na IOX region 150. Thus, the Ag—Na IOX waveguide 102 has a graded refractive index profile n(y,z) with a maximum refractive index $n_1$ below the first major surface 112 and a minimum refractive $n_0$ at the depth of layer DOL, while the first major surface 112 has a refractive index $n_s < n_1$. In one or more embodiments, the refractive index $n_s$ at the first major surface 112 is closer to the bulk refractive index $n_0$ than to the maximum refractive index $n_1$ (i.e., $n_0 \le n_s < n_1$). The final Ag—Na IOX region 150 has a width WGY in the Y-direction. In one or more embodiments, the waveguide 102 is symmetrically shaped in the X-Y plane that is parallel to the first major surface 112.

Figure 3F:
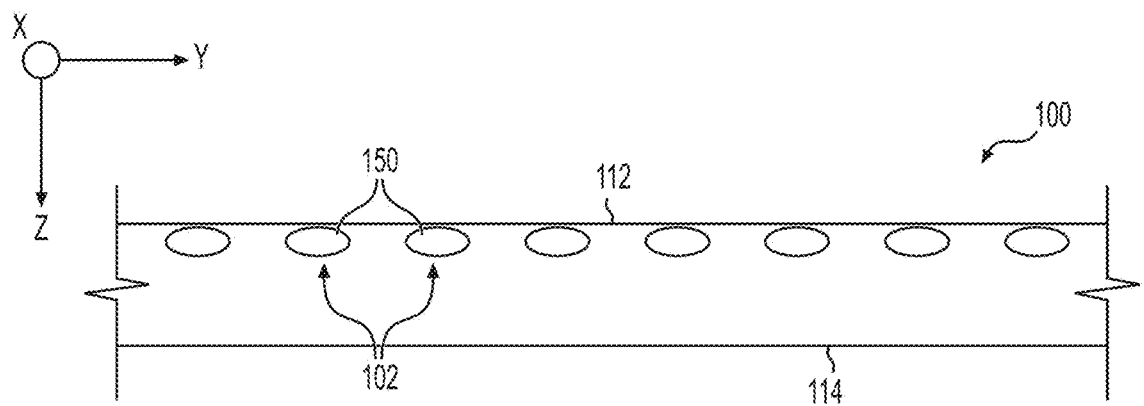
FIGS. 3F and 3G depict a glass substrate comprising a plurality of waveguides extending across a length thereof, according to one or more embodiments.
Figure 3G:
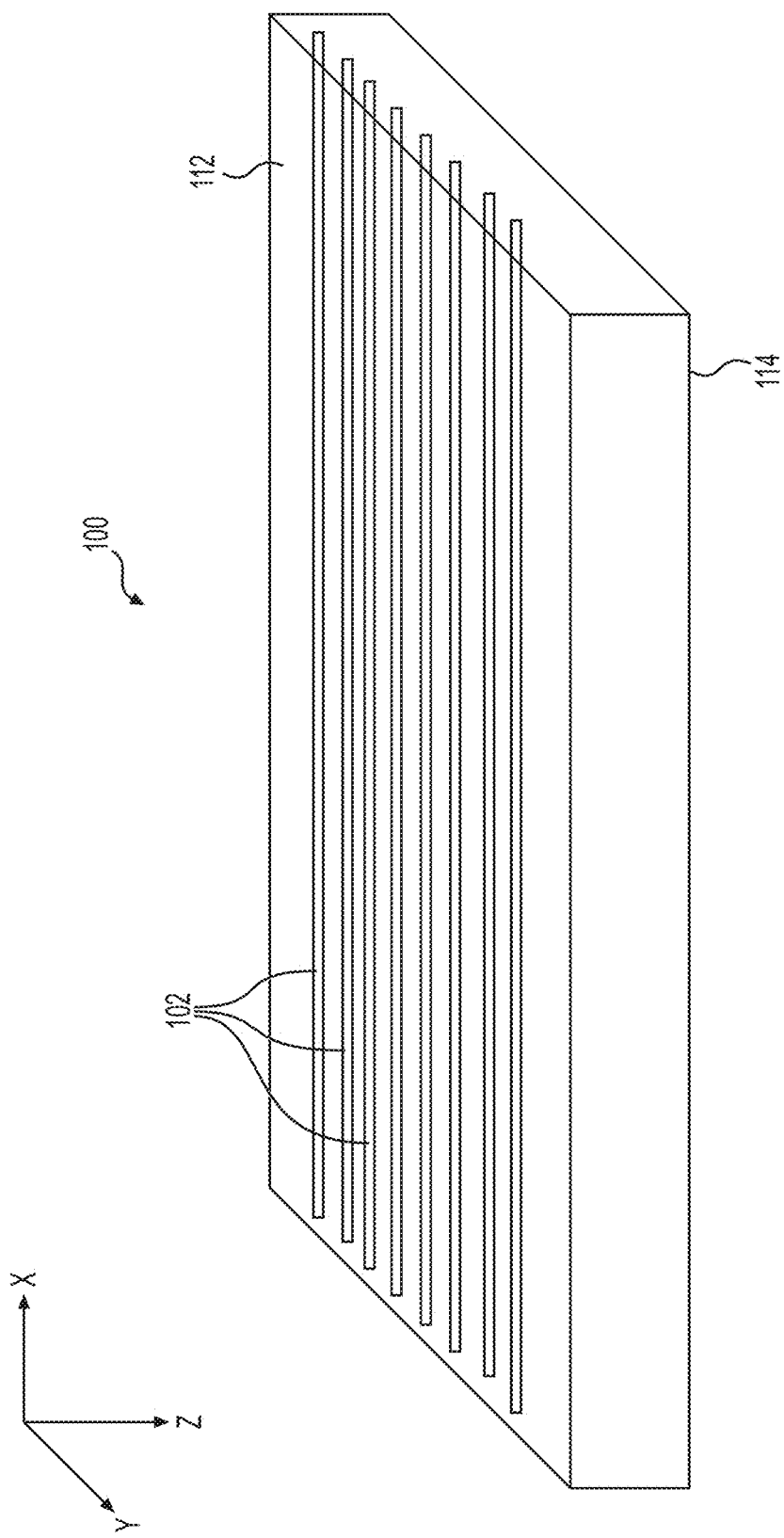

FIG. 3F is similar to FIG. 3E and illustrates an example glass substrate 100 that comprises multiple Ag—Na IOX waveguides 102 formed in the glass substrate 100. FIG. 3G is a top-elevated view of the glass substrate 100 that comprises the multiple IOX waveguides 102 as shown in FIG. 3F. In one or more embodiments, the glass substrate 100 comprising the plurality of waveguides 102 may be singulated into a plurality of singulated substrates, each comprising at least one waveguide 102. In one or more embodiments, the substrate 100 is singulated using laser singulation. The singulated substrates can then be incorporated into photonic chip packages 10, such as shown in FIG. 1.

In one or more embodiments, a glass substrate 100 having glass waveguides 102 as described herein exhibits a silver ion diffusivity of $2\times10^{-21}$ m²/s or less at an operational temperature of 85° C. and/or exhibits a change in core refractive index of 5% or less over a five year lifespan. In the context of the present disclosure, the operational temperature refers to a constant temperature used as a standard by which to measure the diffusivity of the silver ions. However, in practice, the temperature during operation will fluctuate depending on a variety of factors, such as the time of day, percent of system capacity in use, and external factors (such as weather). In one or more embodiments, the operational temperature is an average of the temperature experienced by the glass substrate 100 over a specified time period. In one or more embodiments, a glass substrate 100 having waveguides 102 as described herein exhibits a silver ion diffusivity of $5\times10^{-19}$ m²/s or less at an operational temperature of 110° C., in particular less than $1\times10^{-20}$ m²/s or less at an operation temperature of 110° C., in particular $5\times10^{-21}$ m²/s or less at a operational temperature of 110° C., and more particularly $2\times10^{-21}$ m²/s or less at a operational temperature of 110° C. In one or more embodiments, the glass substrate 100 exhibits a silver ion diffusivity as low a $1\times10^{-24}$ m²/s at an operation temperature of 110° C.

Further, despite the low silver ion diffusivity at operational temperatures, the glass substrate exhibits a high silver ion diffusivity at ion exchange temperatures, such as a silver ion diffusivity of at least $5\times10^{-17}$ m²/s at 350° C., more particularly at least $1\times10^{-16}$ m²/s at 350° C., or most particularly at least $5\times10^{-15}$ m²/s at 350° C.

In one or more embodiments, the glass waveguide 102 as a result of silver ion diffusivity from ion exchange treatment exhibits a change in refractive index of at least about 0.02 at 1310 nm. In particular, in one or more embodiments, the glass substrate 100 exhibits a refractive index change in a range of 0.015 to 0.040 at 1310 nm after undergoing an ion exchange treatment in a 10 wt % $AgNO_3$ salt bath at 350° C. to 400° C.

In one or more embodiments, the waveguides 102 formed in a glass substrate 100 according to the present disclosure exhibit a coupling loss with a single-mode fiber at 1310 nm of 0.04 dB or less over a lifespan of at least 5 years, at least 10 years, or up to 15 years.

While the glass composition of the glass substrate 100 disclosed herein is particularly suitable for formation of Ag—Na IOX waveguides 102 based on the low silver ion diffusivity at operational temperatures, the glass waveguides 102 may alternatively or additionally be formed in the glass substrate 100 using other methods. In one or more embodiments, for example, the glass waveguides 102 may be formed using laser-writing techniques known in the art. Such laser-writing techniques may, for example, employ focused femtosecond laser pulses to change the refractive index of the glass substrate 100 below the first major surface 112 at the focal depth of the focused laser. The glass substrate 100 and laser may be moved relative to one another so as to "write" the waveguide in the glass substrate 100.

Accordingly, in one or more embodiments, at least one glass waveguide 102 is formed in the glass substrate 100 through ion exchange, such as the process described in relation to FIGS. 3A-3G. In one or more such embodiments, the glass waveguides 102 comprise elemental silver, one or more silver ions, one or more silver compounds, or combinations thereof. In one or more other embodiments, at least one glass waveguide 102 is formed in the glass substrate 100 without ion exchange. In one or more such embodiments, the glass waveguides 102 are essentially free of elemental silver, silver ions, and silver compounds and, for example, may be formed through laser writing as described above. Further, in one or more embodiments, the glass substrate 100 includes at least one glass waveguide 102 formed through ion exchange and at least one glass waveguide 102 formed through laser writing.

Tables 1 and 2, below, report expected core index change and single mode fiber (SMF) coupling loss, respectively, as simulated for glasses having diffusivity of silver ions (D) from $1\times10^{-23}$ m²/s to $1\times10^{-20}$ m²/s at operational temperature.

TABLE 1

Lifespan Information by Expected Core
Index Change Based on Diffusivity

| | Core index change [%] | | |
|---|---|---|---|
| D [m²/s] | 5 y | 10 y | 15 y |
| 1.00E−23 | 0 | 0 | 0 |
| 1.00E−22 | 1 | 1 | 1 |
| 1.00E−21 | 4 | 8 | 12 |
| 5.00E−21 | 19 | 30 | 37 |
| 1.00E−20 | 30 | 41 | 46 |

TABLE 2

Lifespan Information by Expected Coupling
Loss Based on Diffusivity

| | SMF coupling loss [dB] | | |
|---|---|---|---|
| D [m²/s] | 5 y | 10 y | 15 y |
| 1.00E−23 | 0 | 0 | 0 |
| 1.00E−22 | 0 | 0 | 0.01 |
| 1.00E−21 | 0.02 | 0.04 | 0.06 |
| 5.00E−21 | 0.1 | 0.25 | 0.4 |
| 1.00E−20 | 0.25 | 0.57 | 0.87 |

For the example illustrated in Table 1, the simulated data was calculated based on an initial waveguide index contrast of 0.005, and the change in index was simulated based on time and diffusivity, including operation temperature. In the example of Table 1, the core index change is considered acceptable so long as it is 5% or below. Thus, for a glass composition having a diffusivity of $10^{-23}$ to $10^{-22}$ m²/s at operational temperature, the glass substrate would be expected to have a lifespan of up to 15 years or more. For a glass composition having a diffusivity of $10^{-21}$ m²/s at operational temperature, the glass substrate would be expected to have a lifespan of at least 5 years. For glass compositions having a diffusivity of $5 \times 10^{-21}$ m²/s or greater at operational temperature, the glass substrates would not be expected to have an acceptable lifespan for datacenter and telecommunication applications based on changes to waveguide core refractive index.

For the example illustrated in Table 2, the coupling loss between the Ag—Na IOX waveguide and a single-mode fiber at 1310 nm was simulated. In Table 2, the coupling loss is considered acceptable so long as it is 0.04 dB or less. Again, for a glass composition having a diffusivity of $10^{-23}$ to $10^{-22}$ m²/s at operational temperature, the glass substrate would be expected to have a lifespan of up to 15 years or more. For a glass composition having a diffusivity of $10^{-21}$ m²/s at operational temperature, the glass substrate would be expected to have a lifespan of at least 10 years. For glass compositions having a diffusivity of $5 \times 10^{-21}$ m²/s or greater at operational temperature, the glass substrates would not be expected to have an acceptable lifespan for datacenter and telecommunication applications based on expected coupling loss.

The glass composition described herein is configured to allow for silver ion diffusivity at ion exchange temperatures while limiting silver ion diffusivity at operational temperatures. Within the composition, the amount of alumina ($Al_2O_3$) is provided to promote ion exchange on the one hand but limited to at most 20 mol % to prevent the exchange of ions from happening too fast. Boric oxide ($B_2O_3$) is also provided to moderate the rate of ion exchange. Together, the alumina and boric oxide allow for well-defined waveguides to be formed in the glass substrate by limiting ion conductivity through increases to the amount of non-bridging oxygen in the glass composition. In embodiments in which it is included, strontium oxide (SrO) is also provided in the composition to slow the rate of ion exchange. Sodium oxide ($Na_2O$) is provided in the glass composition to provide $Na^+$ ions for exchange with the $Ag^+$ ions. In some circumstances, potassium oxide ($K_2O$) may be used also in conjunction with sodium oxide for the ion exchange. Cesium oxide ($Cs_2O$) is provided in the glass composition because the ion is larger than the $Na^+$ and $Ag^+$ ions, which slows down the diffusivity of the $Ag^+$ ions at operational temperature. Rubidium oxide ($Rb_2O$) can operate similarly to cesium oxide in this regard, but it is less effective and increases the cost of the glass. Notwithstanding, if the glass composition comprises at least 0.25 mol % of SrO or if the glass comprises at least 0.6 mol % of $Cs_2O/Rb_2O$, the $Rb_2O$ may be used interchangeably with $Cs_2O$ up to a combined amount of 8 mol %.

TABLE 3

Example Glass Compositions (mol %) according to the Present Disclosure

| | Comp. 1 | Comp. 2 | Comp. 3 | Comp. 4 | Comp. 5 | Comp. 6 | Comp. 7 |
|---|---|---|---|---|---|---|---|
| $SiO_2$ | 53-80 | 65-70 | 53-84 | 53-84 | 53-84 | 53-84 | 59-84 |
| $Cs_2O$ | 0.05-6 | 1-4 | 0.25-8 | 0.35-8 | 0.35-8 | — | — |
| $Al_2O_3$ | 2-12 | 3-6 | 0.3-20 | 1-20 | 1-20 | 2-16 | 0.3-20 |
| $B_2O_3$ | 4-15 | 9-11 | 0.25-16 | 0-20 | 0-20 | 4-16 | 0.25-16 |
| $Na_2O$ | 4-12 | 6-10 | 3-16 | 3.2-12.75 | 3.2-16 | 4-16 | 3-16 |
| SrO | 3-7 | 3-7 | 0-10 | 0-10 | 0-10 | 0.25-7 | 0-10 |
| MgO | 0-5 | 1-3 | 0-5.3 | 0-8 | 0-5.3 | — | 0-5.3 |
| $K_2O$ | 0-6 | 0-4 | 0-8 | 0-4.5 | 0-4.5 | — | 0-8 |
| CaO | 0-4 | 0-4 | 0-8 | 0-8 | 0-8 | 0-15 | 0-8 |
| $Rb_2O$ | 0-4 | 0-4 | 0-4 | 0-6 | 0-8 | — | — |
| $Fe_2O_3$ | 0-0.2 | 0-0.2 | 0.02 | 0-0.2 | 0-0.2 | 0-0.2 | 0-0.2 |
| BaO | 0-4 | 0-4 | 0-8 | — | — | — | 0-8 |
| MgO + CaO + SrO | — | — | — | 1-16 | 1-16 | — | — |
| $Rb_2O$ + $Cs_2O$ | — | — | — | — | — | 0.05-8 | 0.6-8 |

The glass compositions broadly described in Table 3 provide a desirable combination of high silver ion diffusivity at IOX temperatures, low silver ion diffusivity at operational temperatures, and sufficient change in refractive index using a standard IOX treatment for use as glass substrates 100 comprising glass waveguides 102 according to the present disclosure.

EXPERIMENTAL EXAMPLES

Example 1

In Table 4, below, examples of glass compositions suitable for use as the glass substrate 100 of the photonoic chip package 10 are described.

TABLE 4

| Glass Compositions for Glass Substrate of Photonic Chip Package | | | |
|---|---|---|---|
| | Glass 1 | Glass 2 | Glass 3 |
| $SiO_2$ | 67.5 | 67.1 | 69.2 |
| $Al_2O_3$ | 4.9 | 4.9 | 4.0 |
| $B_2O_3$ | 10.0 | 9.5 | 10.0 |
| MgO | 1.7 | 2.0 | 2.1 |
| $Na_2O$ | 9.0 | 6.9 | 6.6 |
| SrO | 4.2 | 6.9 | 6.0 |
| $Cs_2O$ | 2.4 | 2.4 | 2.1 |
| $SnO_2$ | 0.1 | 0.1 | 0.1 |

Figure 4:
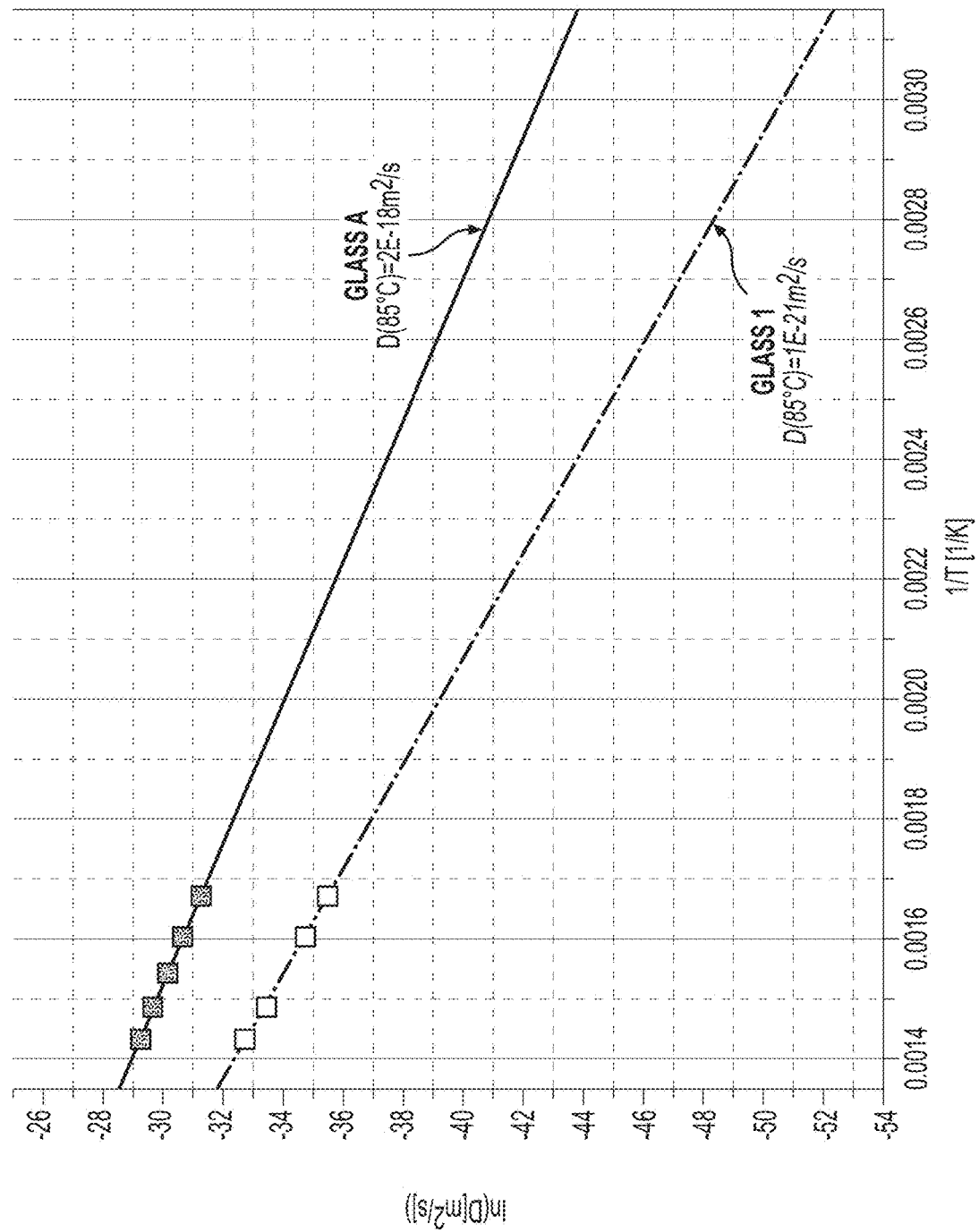
FIG. 4 is a graph of silver ion diffusivity as a function of temperature for a comparative glass composition and for a glass composition according to the present disclosure.

The temperature dependent diffusivity D(T) for the silver ions for Glass 1 was calculated in the temperature range of 325° C. to 425° C. and extrapolated to the operational temperature of 110° C. and below. A similar measurement was done for a comparative glass having an alkali aluminosilicate composition ("Glass A"). The graph of the temperature dependent diffusivity D(T) is provided in FIG. 4 in which the inverse of temperature is the x-axis in units of 1/K and in which the natural log (ln) of diffusivity ($m^2/s$) is the y-axis. As can be seen at 85° C., Glass A had a diffusivity that was over 3 orders of magnitude higher than the diffusivity of Glass 1 ($2 \times 10^{-18}$ $m^2/s$ vs. $1 \times 10^{-21}$ $m^2/s$). This difference in diffusivity of the glass substrates based on glass composition amounts to a difference in lifespan of only a few hours for Glass A as compared to 5 years or more for Glass 1 based on diffusion-related changes to the waveguide that affect refractive index change and optical coupling loss.

Example 2

Figure 5A:
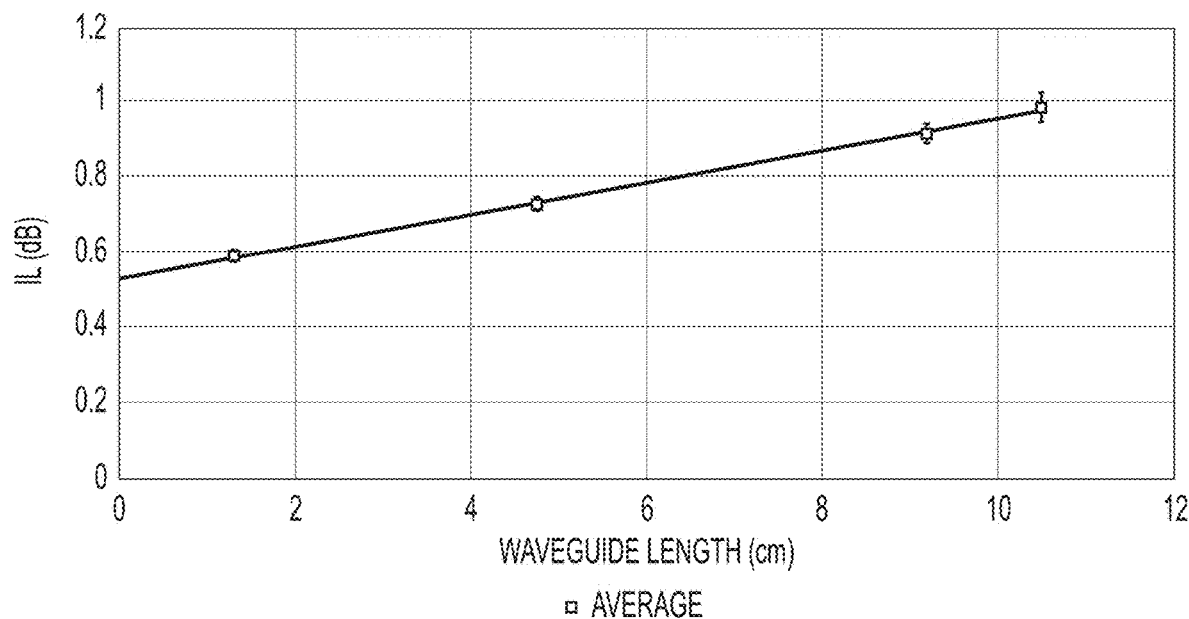
FIGS. 5A and 5B are graphs of propagation loss as a function of length for waveguides formed in glass substrates, according to one or more embodiments.
Figure 5B:
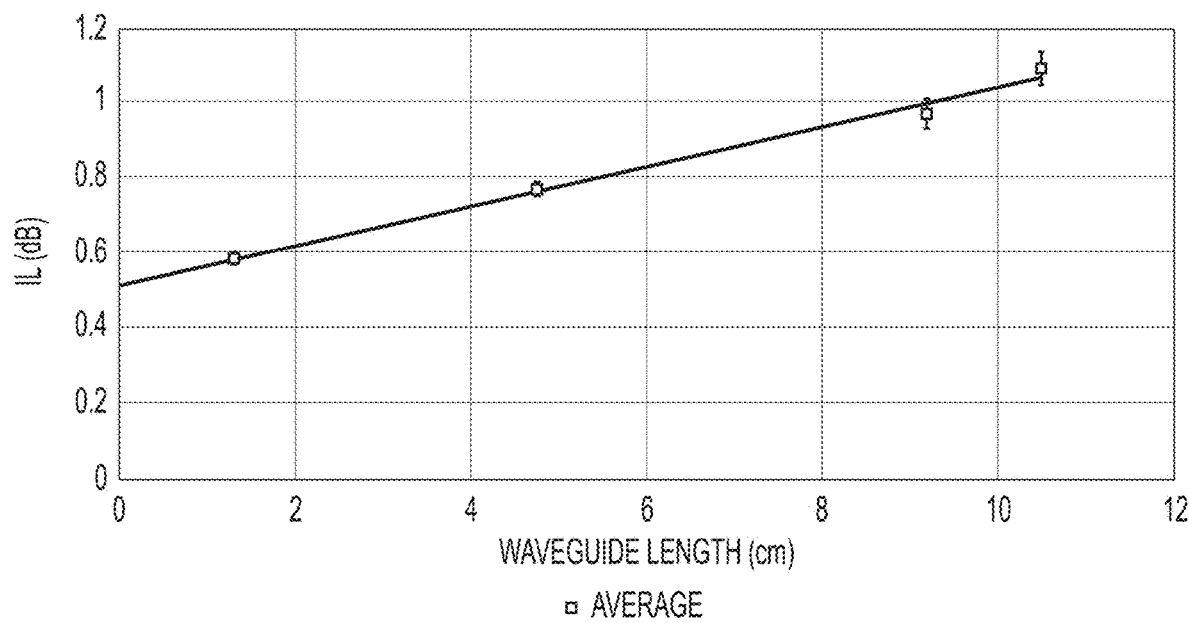

Using a glass substrate of Glass 1, waveguides were formed in the glass substrate using the Ag—Na IOX process described above. In particular, the glass substrates were wafers having diameter of 150 mm, and the waveguides were formed at various lengths, including about 1 cm, about 5 cm, about 9 cm, and about 11 cm. At least 10 waveguides of each length were measured for propagation loss of optical transmissions at 1310 nm and 1550 nm. The measurements of propagation loss were made after the wafer was singulated into samples of different lengths, such as 1 cm and 5 cm. The average propagation loss (IL) for each distance as well as the standard deviation are plotted in FIGS. 5A and 5B. From FIG. 5A, it was determined that the propagation loss at 1310 nm was 0.0426 dB/cm, and from FIG. 5B, it was determined that the propagation loss at 1550 nm was 0.0531 dB/cm.

Example 3

For each of Glasses 1-3, the diffusivity of silver ions was determined at 85° C. and at 110° C. For Glass 1, the thermal diffusivity at 85° C. was $1.04 \times 10^{-21}$ $m^2/s$, and at 110° C., the thermal diffusivity was $1.04 \times 10^{-21}$ $m^2/s$. For Glass 2, the thermal diffusivity at 85° C. was $1.75 \times 10^{-22}$ $m^2/s$, and at 110° C., the thermal diffusivity was $1.58 \times 10^{-21}$ $m^2/s$. For Glass 3, the thermal diffusivity at 85° C. was $1.08 \times 10^{-21}$ $m^2/s$, and at 110° C., the thermal diffusivity was $8.29 \times 10^{-21}$ $m^2/s$. Thus, for Glass 2, which contained slightly less $SiO_2$ and slightly more SrO, the diffusivity can be held lower at increasing temperature as compared to Glasses 1 and 3. Notwithstanding, all of the glasses retained a diffusivity on the order of $10^{-21}$ $m^2/s$ up to the end of the operational temperature of 110° C.

Example 4

Provided in Table 5, below, are example glass compositions suitable for use as the glass substrate according to the present disclosure. In particular, the glass compositions have a silver ion diffusivity at operational temperature (110° C.) that is low enough to provide a long working lifespan. Further, as shown Table 5, the disclosed glass compositions provide sufficiently high silver ion diffusivity at IOX treatment temperatures to permit economical preparation of glass waveguides 102 in the glass substrates 100. Further, in addition to the balance of silver ion diffusivity, the disclosed glass compositions also provide sufficient refractive index change after silver IOX treatment to operate as waveguides 102.

TABLE 5

| Glass compositions (mol %) having low $Ag^+$ Diffusivity at Operational Temperatures | | | | | | |
|---|---|---|---|---|---|---|
| | Glass 4 | Glass 5 | Glass 6 | Glass 7 | Glass 8 | Glass 9 |
| $SiO_2$ | 68.1 | 67.9 | 64.5 | 67.5 | 67.9 | 67.1 |
| $Al_2O_3$ | 3.8 | 3.8 | 5.2 | 3.8 | 5.0 | 4.9 |
| $B_2O_3$ | 9.4 | 9.5 | 13.0 | 9.8 | 9.6 | 9.5 |
| $P_2O_5$ | — | — | — | — | — | — |
| $Na_2O$ | 4.0 | 6.0 | 10.0 | 8.1 | 6.9 | 6.9 |
| $K_2O$ | 3.7 | 1.8 | 0.01 | 0.01 | 0.01 | 0.01 |
| MgO | 2.9 | 2.9 | — | 2.9 | 2.9 | 2.0 |
| CaO | 0.03 | 0.03 | 0.02 | 0.03 | 2.1 | 0.05 |
| SrO | 5.2 | 5.2 | 4.3 | 5.1 | 4.0 | 6.9 |
| BaO | — | — | — | — | — | 0.01 |
| $Y_2O_3$ | — | — | — | — | — | — |
| $Rb_2O$ | — | — | — | — | 0.003 | 0.004 |
| $Cs_2O$ | 2.7 | 2.8 | 2.9 | 2.7 | 2.4 | 2.4 |

TABLE 5-continued

|  | | | | | | |
|---|---|---|---|---|---|---|
| SnO$_2$ | — | — | 0.08 | — | 0.07 | 0.07 |
| Ag$^+$ Diffusivity at 110° C. | 1.24 × 10$^{-24}$ | 4.02 × 10$^{-24}$ | 1.07 × 10$^{-21}$ | 1.21 × 10$^{-21}$ | 1.51 × 10$^{-21}$ | 1.58 × 10$^{-21}$ |
| Ag$^+$ Diffusivity at 350° C. | 6.41 × 10$^{-17}$ | 1.13 × 10$^{-16}$ | 5.02 × 10$^{-16}$ | 3.87 × 10$^{-16}$ | 3.48 × 10$^{-16}$ | 2.96 × 10$^{-16}$ |
| Index Change after IOX | 0.025 | 0.027 | 0.032 | 0.032 | 0.023 | 0.024 |

|  | Glass 10 | Glass 11 | Glass 12 | Glass 13 | Glass 14 | Glass 15 |
|---|---|---|---|---|---|---|
| SiO$_2$ | 69.7 | 65.6 | 67.9 | 67.6 | 67.4 | 65.4 |
| Al$_2$O$_3$ | 5.0 | 4.8 | 5.0 | 5.0 | 5.0 | 5.3 |
| B$_2$O$_3$ | 9.6 | 12.8 | 9.9 | 9.8 | 9.9 | 10.4 |
| P$_2$O$_5$ | — | — | — | — | — | — |
| Na$_2$O | 7.0 | 9.5 | 7.0 | 9.0 | 7.0 | 9.5 |
| K$_2$O | 0.01 | 0.01 | 0.01 | 0.01 | 0.01 | — |
| MgO | 2.0 | 0.01 | 2.0 | 2.0 | 4.1 | 2.1 |
| CaO | 0.04 | 0.02 | 0.04 | 0.04 | 0.05 | — |
| SrO | 4.0 | 4.0 | 2.9 | 4.0 | 4.0 | 4.4 |
| BaO | — | — | — | — | — | — |
| Y$_2$O$_3$ | — | — | 1.6 | — | — | — |
| Rb$_2$O | 0.003 | 0.003 | 0.004 | — | 0.003 | — |
| Cs$_2$O | 2.5 | 3.0 | 2.5 | 2.5 | 2.5 | 2.8 |
| SnO$_2$ | 0.07 | 0.07 | 0.07 | — | 0.07 | 0.08 |
| Ag$^+$ Diffusivity at 110° C. | 2.11 × 10$^{-21}$ | 2.25 × 10$^{-21}$ | 2.34 × 10$^{-21}$ | 2.36 × 10$^{-21}$ | 2.47 × 10$^{-21}$ | 2.56 × 10$^{-21}$ |
| Ag$^+$ Diffusivity at 350° C. | 5.25 × 10$^{-16}$ | 3.76 × 10$^{-16}$ | 3.90 × 10$^{-16}$ | 6.03 × 10$^{-16}$ | 3.90 × 10$^{-16}$ | 5.74 × 10$^{-16}$ |
| Index Change after IOX | 0.020 | 0.033 | 0.022 | 0.028 | 0.022 | 0.032 |

|  | Glass 16 | Glass 17 | Glass 18 | Glass 19 | Glass 20 | Glass 21 |
|---|---|---|---|---|---|---|
| SiO$_2$ | 67.0 | 63.8 | 69.2 | 67.2 | 67.2 | 66.9 |
| Al$_2$O$_3$ | 5.1 | 7.1 | 2.9 | 5.2 | 4.9 | 5.2 |
| B$_2$O$_3$ | 9.9 | 9.2 | 9.6 | 10.8 | 9.7 | 11.8 |
| P$_2$O$_5$ | — | — | 0.02 | — | — | — |
| Na$_2$O | 9.2 | 10.1 | 9.0 | 9.2 | 7.0 | 9.2 |
| K$_2$O | — | 0.01 | 0.004 | — | 0.004 | — |
| MgO | — | — | 2.0 | — | 3.0 | — |
| CaO | — | 0.03 | 0.04 | — | 0.04 | — |
| SrO | 4.2 | 4.2 | 4.1 | 4.2 | 5.2 | 4.3 |
| BaO | — | — | — | — | — | — |
| Y$_2$O$_3$ | 1.6 | 2.0 | — | 0.6 | — | — |
| Rb$_2$O | — | — | — | — | — | — |
| Cs$_2$O | 2.9 | 3.4 | 2.8 | 2.7 | 2.9 | 2.6 |
| SnO$_2$ | 0.07 | 0.08 | 0.07 | 0.07 | 0.07 | 0.08 |
| Ag$^+$ Diffusivity at 110° C. | 2.81 × 10$^{-21}$ | 3.36 × 10$^{-21}$ | 3.69 × 10$^{-21}$ | 4.13 × 10$^{-21}$ | 4.15 × 10$^{-21}$ | 4.21 × 10$^{-21}$ |
| Ag$^+$ Diffusivity at 350° C. | 5.84 × 10$^{-16}$ | 7.41 × 10$^{-16}$ | 4.89 × 10$^{-16}$ | 6.97 × 10$^{-16}$ | 3.89 × 10$^{-16}$ | 6.33 × 10$^{-16}$ |
| Index Change after IOX | 0.030 | 0.037 | 0.039 | 0.028 | 0.024 | 0.027 |

|  | Glass 22 | Glass 23 | Glass 24 | Glass 25 | Glass 26 | Glass 27 |
|---|---|---|---|---|---|---|
| SiO$_2$ | 65.0 | 73.3 | 67.5 | 65.4 | 63.5 | 71.6 |
| Al$_2$O$_3$ | 5.3 | 4.0 | 5.0 | 5.3 | 7.2 | 4.3 |
| B$_2$O$_3$ | 12.4 | 7.8 | 9.8 | 10.2 | 11.5 | 8.4 |
| P$_2$O$_5$ | — | 0.002 | — | — | — | — |
| Na$_2$O | 9.8 | 7.4 | 8.9 | 10.2 | 10.1 | 7.8 |
| K$_2$O | — | 0.004 | 0.01 | — | 0.01 | 0.004 |
| MgO | — | 1.6 | 2.0 | 1.1 | — | 1.7 |
| CaO | — | 0.03 | 0.04 | — | 0.03 | 0.03 |
| SrO | 4.5 | 3.4 | 4.0 | 44 | 4.3 | 3.6 |
| BaO | — | — | 0.01 | — | — | — |
| Y$_2$O$_3$ | — | — | — | — | — | — |
| Rb$_2$O | — | — | 1.5 | — | — | — |
| Cs$_2$O | 2.9 | 2.4 | 1.2 | 3.3 | 3.3 | 2.5 |

TABLE 5-continued

|  |  |  |  |  |  |  |
|---|---|---|---|---|---|---|
| $SnO_2$ | 0.08 | 0.06 | 0.07 | 0.08 | 0.08 | 0.06 |
| $Ag^+$ Diffusivity at 110° C. | $4.30 \times 10^{-21}$ | $4.78 \times 10^{-21}$ | $5.61 \times 10^{-21}$ | $5.73 \times 10^{-21}$ | $6.00 \times 10^{-21}$ | $6.34 \times 10^{-21}$ |
| $Ag^+$ Diffusivity at 350° C. | $5.61 \times 10^{-16}$ | $8.00 \times 10^{-16}$ | $8.18 \times 10^{-16}$ | $6.46 \times 10^{-16}$ | $8.99 \times 10^{-16}$ | $7.11 \times 10^{-16}$ |
| Index Change after IOX | 0.029 | 0.023 | 0.032 | 0.039 | 0.032 | 0.027 |

|  | Glass 28 | Glass 29 | Glass 30 | Glass 31 | Glass 32 | Glass 33 |
|---|---|---|---|---|---|---|
| $SiO_2$ | 69.6 | 68.4 | 68.0 | 69.2 | 67.5 | 67.2 |
| $Al_2O_3$ | 4.6 | 4.8 | 3.0 | 4.0 | 4.9 | 4.9 |
| $B_2O_3$ | 9.0 | 9.4 | 11.2 | 10.0 | 10.0 | 11.3 |
| $P_2O_5$ | 0.01 | — | 0.01 | — | — | — |
| $Na_2O$ | 8.4 | 8.8 | 9.0 | 6.6 | 9.0 | 9.1 |
| $K_2O$ | 0.004 | 0.01 | 0.004 | — | 0.01 | 0.004 |
| MgO | 1.8 | 0.01 | 2.0 | 2.1 | 1.7 | 0.5 |
| CaO | 0.04 | 0.03 | 0.04 | 0.02 | 0.03 | 0.03 |
| SrO | 3.8 | 4.1 | 4.2 | 6.0 | 4.2 | 4.3 |
| BaO | — | 0.01 | — | — | — | — |
| $Y_2O_3$ | — | 1.9 | — | — | — | — |
| $Rb_2O$ | — | 0.002 | — | — | 0.003 | 0.003 |
| $Cs_2O$ | 2.6 | 2.3 | 2.6 | 2.1 | 2.4 | 2.5 |
| $SnO_2$ | 0.07 | 0.07 | 0.07 | 0.07 | 0.07 | 0.08 |
| $Ag^+$ Diffusivity at 110° C. | $7.22 \times 10^{-21}$ | $7.29 \times 10^{-21}$ | $7.65 \times 10^{-21}$ | $8.29 \times 10^{-21}$ | $8.37 \times 10^{-21}$ | $9.58 \times 10^{-21}$ |
| $Ag^+$ Diffusivity at 350° C. | $6.81 \times 10^{-16}$ | $7.57 \times 10^{-16}$ | $4.43 \times 10^{-16}$ | $6.30 \times 10^{-16}$ | $8.14 \times 10^{-16}$ | $7.96 \times 10^{-16}$ |
| Index Change after IOX | 0.030 | 0.031 | 0.034 | 0.025 | 0.031 | 0.030 |

|  | Glass 34 | Glass 35 | Glass 36 | Glass 37 | Glass 38 | Glass 39 |
|---|---|---|---|---|---|---|
| $SiO_2$ | 62.5 | 63.8 | 64.4 | 64.4 | 64.5 | 62.9 |
| $Al_2O_3$ | 9.8 | 9.1 | 18.0 | 9.0 | 9.7 | 9.1 |
| $B_2O_3$ | 9.1 | 9.5 | 2.0 | 9.2 | 9.4 | 9.9 |
| $P_2O_5$ | — | — | — | — | — | — |
| $Na_2O$ | 10.6 | 10.0 | 7.0 | 9.8 | 10.6 | 10.2 |
| $K_2O$ | 0.01 | 0.01 | 0.01 | 1.9 | 0.01 | 0.01 |
| MgO | — | — | 3.0 | — | — | — |
| CaO | 2.0 | 2.0 | 0.04 | 0.02 | 0.03 | 0.02 |
| SrO | 4.7 | 2.1 | 3.0 | 4.1 | 2.4 | 2.1 |
| BaO | — | — | — | — | 0.01 | — |
| $Y_2O_3$ | — | — | — | — | — | 2.0 |
| $Rb_2O$ | — | — | — | — | — | — |
| $Cs_2O$ | 3.4 | 3.4 | 2.6 | 1.6 | 3.4 | 3.7 |
| $SnO_2$ | 0.08 | 0.08 | 0.07 | 0.07 | 0.08 | 0.08 |
| $Ag^+$ Diffusivity at 110° C. | $1.17 \times 10^{-20}$ | $1.24 \times 10^{-20}$ | $1.62 \times 10^{-20}$ | $2.32 \times 10^{-20}$ | $3.53 \times 10^{-20}$ | $4.45 \times 10^{-20}$ |
| $Ag^+$ Diffusivity at 350° C. | $1.65 \times 10^{-15}$ | $1.59 \times 10^{-15}$ | $2.53 \times 10^{-15}$ | $2.27 \times 10^{-15}$ | $3.05 \times 10^{-15}$ | $2.14 \times 10^{-15}$ |
| Index Change after IOX | 0.031 | 0.032 | 0.017 | 0.036 | 0.027 | 0.031 |

|  | Glass 40 | Glass 41 | Glass 42 | Glass 43 |
|---|---|---|---|---|
| $SiO_2$ | 66.2 | 64.9 | 64.8 | 64.5 |
| $Al_2O_3$ | 9.1 | 9.6 | 9.4 | 9.9 |
| $B_2O_3$ | 11.3 | 9.5 | 9.5 | 9.2 |
| $P_2O_5$ | — | — | — | — |
| $Na_2O$ | 10.0 | 12.4 | 12.2 | 13.0 |
| $K_2O$ | 0.01 | 0.01 | 0.01 | 0.01 |
| MgO | — | — | — | — |
| CaO | — | 0.02 | 0.02 | 0.02 |
| SrO | — | — | 2.2 | — |
| BaO | — | — | 0.01 | — |
| $Y_2O_3$ | — | — | — | — |
| $Rb_2O$ | 0.001 | 1.8 | — | — |

TABLE 5-continued

| | | | | |
|---|---|---|---|---|
| $Cs_2O$ | 3.3 | 1.7 | 1.7 | 3.2 |
| $SnO_2$ | 0.08 | 0.08 | 0.08 | 0.09 |
| $Ag^+$ Diffusivity at 110° C. | $5.76 \times 10^{-20}$ | $2.28 \times 10^{-19}$ | $3.02 \times 10^{-19}$ | $3.93 \times 10^{-19}$ |
| $Ag^+$ Diffusivity at 350° C. | $4.61 \times 10^{-15}$ | $6.67 \times 10^{-15}$ | $8.86 \times 10^{-15}$ | $8.08 \times 10^{-15}$ |
| Index Change after IOX | 0.016 | 0.033 | 0.033 | 0.035 |

Example 5

Figure 6:
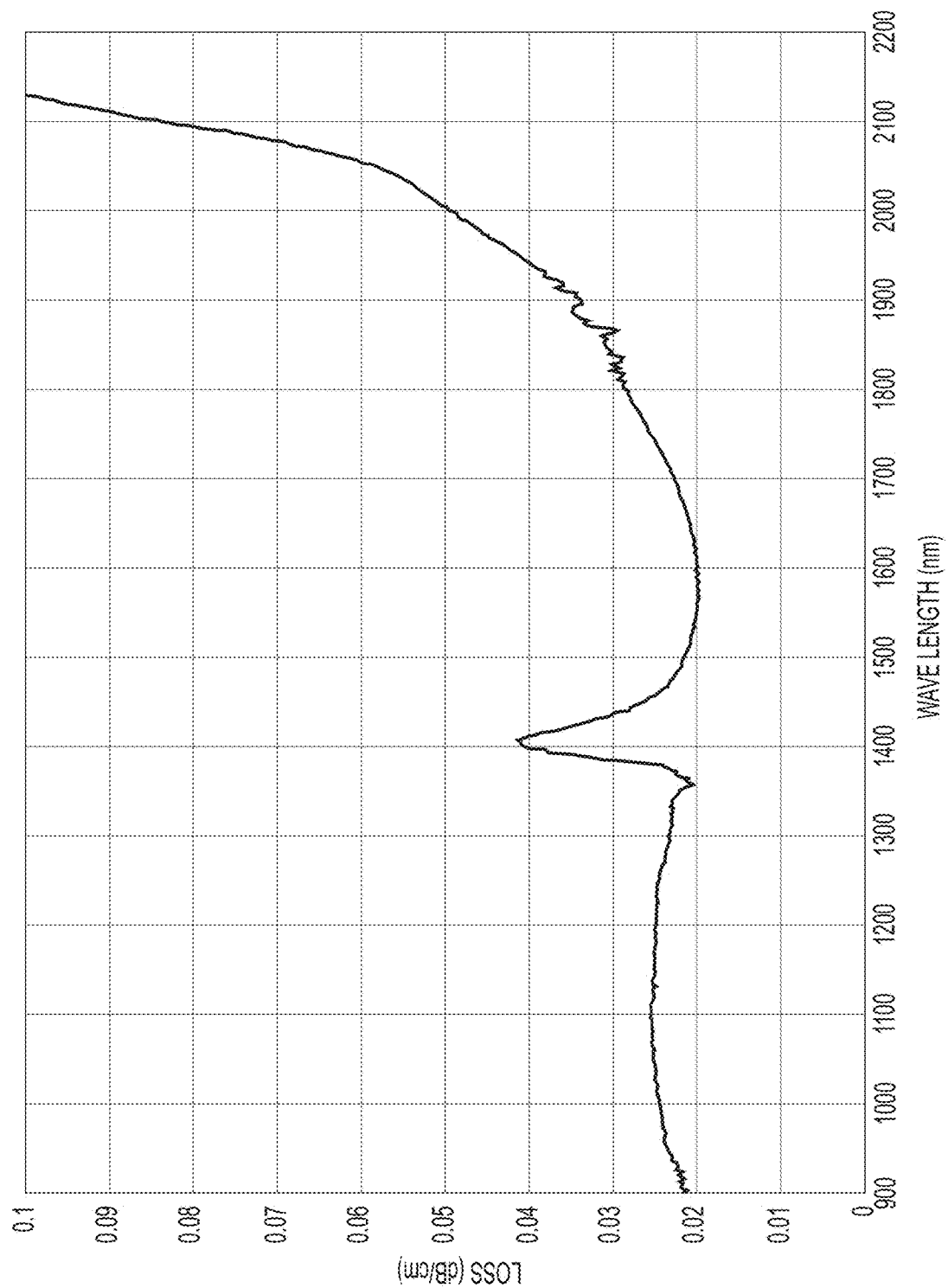
FIG. 6 is a graph of propagation loss as a function of wavelength according to one or more embodiments.

FIG. 6 is a graph of propagation loss as a function of wavelength for a glass substrate having the composition of Glass 1. The spectral absorption was measured at pathlengths of 0.6 mm, 10 mm, 20 mm, 40 mm, and 80 mm, and the slope of the absorption with pathlength was calculated at every wavelength to give the propagation loss as a function of wavelength. As can be seen from FIG. 6, a glass according to the present disclosure exhibits low propagation loss. In particular, in the range of 700 nm to 2000 nm, it was observed that the propagation loss was below 0.1 dB/cm, in particular below 0.05 dB/cm. Such low loss is advantageous waveguide applications regardless of the method of formation (i.e., IOX formed or laser written).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A glass article, comprising:
   a glass substrate comprising glass having a composition, in terms of mol % on a representative oxide basis, comprising:
   $SiO_2$ in an amount in a range from 53 mol % to 84 mol %;
   $Al_2O_3$ in an amount in a range from 0.3 mol % to 20 mol %;
   $Na_2O$ in an amount in a range from 3 mol % to 16 mol %; and
   $Cs_2O$ in an amount in a range from 0.05 mol % to 8 mol %;
   a first major surface of the glass substrate;
   a second major surface of the glass substrate opposite to the first major surface;
   a waveguide comprising silver disposed in the glass substate between the first major surface and the second major surface, and closer to the first major surface than the second major surface.

2. The article of claim 1, further comprising a depth of layer of less than 80 micrometers for the silver.

3. The article of claim 1, further comprising a depth of layer of at least 4 micrometers for the silver.

4. The article of claim 1, wherein the waveguide has a width of at least 1 micrometer.

5. The article of claim 1, wherein the waveguide has a width of no more than 50 micrometers.

6. A glass article, comprising:
   a glass substrate comprising glass having a composition, in terms of mol % on a representative oxide basis, comprising:
   $SiO_2$ in an amount in a range from 53 mol % to 84 mol %;
   $Al_2O_3$ in an amount in a range from 0.3 mol % to 20 mol %;
   $Na_2O$ in an amount in a range from 3 mol % to 16 mol %; and
   $Cs_2O$ in an amount in a range from 0.05 mol % to 8 mol %;
   a first major surface of the glass substrate;
   a second major surface of the glass substrate opposite to the first major surface;
   a waveguide disposed in the glass substate between the first major surface and the second major surface, and closer to the first major surface than the second major surface;
   wherein the waveguide has a refractive index profile comprising a first refractive index ($n_s$) at the first major surface, a bulk refractive index ($n_0$) of the glass, and a maximum refractive index ($n_1$) within the waveguide such that $n_0 < n_1$ and such that $n_0 \leq n_s$.

7. The glass article of claim 6, wherein the glass further comprises $B_2O_3$ in the amount in a range from 4 mol % to 15 mol %.

8. The glass article of claim 6, wherein the glass further comprising alkaline earth metal oxides of the group consisting of MgO, CaO, and SrO.

9. The glass article of claim 8, wherein a sum of the alkaline earth metal oxides of the group is in a range of 1 mol % to 16 mol %.

10. The glass article of claim 8, wherein the glass further comprises SrO in an amount in a range from 3 mol % to 7 mol %.

11. The glass article of claim 10, wherein the glass comprises no more than 0.5 mol % in total of trace metal oxides of the group consisting of oxides of iron, chromium, nickel, copper, and arsenic.

12. A glass article, comprising:
a glass substrate comprising glass having a composition, in terms of mol % on a representative oxide basis, comprising:
  $SiO_2$ in an amount in a range from 53 mol % to 84 mol %;
  $Al_2O_3$ in an amount in a range from 0.3 mol % to 20 mol %;
  $B_2O_3$ in an amount in a range from 4 mol % to 15 mol %;
  $Na_2O$ in an amount in a range from 3 mol % to 16 mol %; and
  $Cs_2O$ in an amount in a range from 0.05 mol % to 8 mol %;
  alkaline earth metal oxides of the group consisting of MgO, CaO, and SrO, wherein a sum of the alkaline earth metal oxides of the group is in a range of 1 mol % to 16 mol %
a first major surface of the glass substrate;
a second major surface of the glass substrate opposite to the first major surface;
a waveguide comprising silver disposed in the glass substate between the first major surface and the second major surface,
wherein the waveguide has a refractive index profile comprising a first refractive index ($n_s$) at the first major surface, a bulk refractive index ($n_0$) of the glass, and a maximum refractive index ($n_1$) within the waveguide such that $n_0 < n_1$ and such that $n_0 \leq n_s$.

13. The glass article of claim 12, wherein the glass further comprises SrO in an amount in a range from 3 mol % to 7 mol %.

14. The glass article of claim 13, wherein the waveguide has a propagation loss of 0.1 dB/cm or less at 1310 nm.

15. The glass article of claim 14, wherein the waveguide comprises a depth of layer in a range of 4 μm to 15 μm below the first major surface.

16. The glass article of claim 13, wherein the waveguide comprises a width in a range from 10 μm to 50 μm.

17. The glass article of claim 12, wherein the first refractive index of the glass waveguide is a maximum refractive index within the waveguide such that $n_0 < n_s$.

18. The glass article of claim 17, wherein $(n_s - n_0) \geq 0.015$.

19. The glass article of claim 12, wherein at least a portion of the glass waveguide is disposed at the first major surface.

20. The glass article of claim 12, wherein the glass waveguide has a symmetric shape in a plane parallel to the first major surface.

* * * * *